US009723666B2

(12) United States Patent
Nakajo

(10) Patent No.: US 9,723,666 B2
(45) Date of Patent: Aug. 1, 2017

(54) LIGHTING DEVICE AND LIGHTING FIXTURE USING SAME

(71) Applicant: Panasonic Intellectual Property Management Co., Ltd., Osaka (JP)

(72) Inventor: Akira Nakajo, Kyoto (JP)

(73) Assignee: Panasonic Intellectual Property Management Co., LTD., Osaka (JP)

(*) Notice: Subject to any disclaimer, the term of this patent is extended or adjusted under 35 U.S.C. 154(b) by 0 days.

(21) Appl. No.: 14/986,794

(22) Filed: Jan. 4, 2016

(65) Prior Publication Data

US 2016/0198532 A1 Jul. 7, 2016

(30) Foreign Application Priority Data

Jan. 6, 2015 (JP) ................................. 2015-001079

(51) Int. Cl.
*H05B 33/08* (2006.01)
*H02M 1/36* (2007.01)
(Continued)

(52) U.S. Cl.
CPC .......... *H05B 33/0815* (2013.01); *H02M 1/36* (2013.01); *H02M 3/3376* (2013.01);
(Continued)

(58) Field of Classification Search
CPC ............ H05B 33/0815; H05B 33/0818; H05B 33/0884; H05B 33/0809; H05B 33/0848; H05B 33/0896; H05B 37/029; H05B 37/0245; H05B 37/0254; H05B 41/3925; H05B 41/391; H05B 41/2828; H05B 33/0803
(Continued)

(56) References Cited

U.S. PATENT DOCUMENTS 5,747,942 A * 5/1998 Ranganath ......... H05B 41/3925
315/209 R
7,961,484 B2 * 6/2011 Lalithambika .... H02M 3/33507
363/21.04
(Continued)

FOREIGN PATENT DOCUMENTS

JP 2011-048985 A 3/2011
JP 2011-060615 A 3/2011
(Continued)

*Primary Examiner* — Douglas W Owens
*Assistant Examiner* — Syed M Kaiser
(74) *Attorney, Agent, or Firm* — Renner, Otto, Boisselle & Sklar, LLP

(57) ABSTRACT

Provided is a lighting device including two switching elements, a control circuit, a resonance circuit, a rectification circuit, and a feedback circuit. The control circuit controls two switching elements such that the two switching elements operate separately from each other. The control circuit changes the switching frequencies of the two switching elements from high frequencies to low frequencies, relative to one another, when the operation (switching operation) of the switching elements is started. The control circuit controls the feedback circuit such that the difference output from an error amplifier approaches zero within a period of time from a point of time at which the switching operation is stopped to a point of time at which the switching operation is next started.

19 Claims, 8 Drawing Sheets

(51) Int. Cl.
*H02M 3/337* (2006.01)
*H02M 1/00* (2006.01)

(52) U.S. Cl.
CPC . *H05B 33/0851* (2013.01); *H02M 2001/0025* (2013.01); *H02M 2001/0058* (2013.01); *Y02B 20/346* (2013.01); *Y02B 70/1491* (2013.01)

(58) Field of Classification Search
USPC ............... 315/200 R, 291, 224, 307, 297
See application file for complete search history.

(56) References Cited

U.S. PATENT DOCUMENTS

| | | | | | |
|---|---|---|---|---|---|
| 8,575,849 | B2* | 11/2013 | Simi | ................... | H02M 3/3376 315/219 |
| 8,710,765 | B2* | 4/2014 | Beland | ................ | H02M 1/4258 315/297 |
| 2003/0142513 | A1* | 7/2003 | Vinciarelli | .............. | H02J 1/102 363/17 |
| 2010/0237799 | A1* | 9/2010 | Choi | ..................... | H02M 3/285 315/294 |
| 2010/0265231 | A1* | 10/2010 | Jang | .................... | H02M 1/4241 345/211 |
| 2010/0270949 | A1* | 10/2010 | Onishi | ............... | H05B 41/2856 315/307 |
| 2011/0254461 | A1* | 10/2011 | Summerland | ......... | H02M 7/538 315/291 |
| 2012/0187863 | A1* | 7/2012 | Nonaka | .............. | H05B 33/0815 315/291 |
| 2012/0200230 | A1* | 8/2012 | Esaki | ................. | H05B 33/0851 315/200 R |
| 2012/0249003 | A1 | 10/2012 | Esaki et al. | | |
| 2013/0229126 | A1* | 9/2013 | Ribarich | ................... | G05F 1/70 315/224 |
| 2013/0293267 | A1* | 11/2013 | Gravati | ................ | H03K 17/082 327/109 |
| 2015/0043252 | A1* | 2/2015 | Kuang | .............. | H02M 3/33507 363/21.16 |
| 2016/0057825 | A1* | 2/2016 | Hu | ..................... | H05B 33/0815 315/201 |

FOREIGN PATENT DOCUMENTS

| | | |
|---|---|---|
| JP | 4956409 B2 | 6/2012 |
| JP | 2012-221599 A | 11/2012 |
| JP | 2014-060131 A | 4/2014 |

* cited by examiner

LIGHTING DEVICE AND LIGHTING FIXTURE USING SAME

CROSS-REFERENCE TO RELATED APPLICATIONS

This application claims the benefit of priority on the basis of Japanese Patent Application No. 2015-001079 filed on Jan. 6, 2015, the entire contents of which are hereby incorporated by reference.

TECHNICAL FIELD

The present disclosure relates to a lighting device and a lighting fixture using the same.

BACKGROUND ART

Japanese Patent No. 4956409 discloses an LED lighting fixture provided with a light source unit, which is constituted by an LED, and a switching power source.

The switching power source of the LED lighting fixture described in Japanese Patent No. 4956409 is configured to turn on the light source unit. The switching power source is provided with a series circuit of a first switching element and a second switching element, and a series resonance circuit of a primary winding of an output transformer, a capacitor, and an inductor. The switching power source is also provided with a first control circuit, a second control circuit, a secondary winding of the output transformer, a full-wave rectification circuit, and a smoothing capacitor. The first control circuit and second control circuit control the operation of the first switching element and second switching element, respectively. The light source unit is electrically connected between the terminals of the smoothing capacitor.

The switching power source of the LED lighting fixture described in Japanese Patent No. 4956409 is a so-called composite resonance converter. In such a switching power source, the resonance frequency of the series resonance circuit can change depending on the load state of the light source unit electrically connected between the terminals of the smoothing capacitor, and a surge current can flow therein.

SUMMARY

It is an objective of the present disclosure to provide a lighting device in which a surge current can be suppressed, and a lighting fixture using such a lighting device.

A lighting device according to one aspect of the present disclosure includes: a pair of input terminals; a pair of output terminals; at least two switching elements; a control circuit; a resonance circuit; a rectification circuit; a second capacitor; and a feedback circuit. The control circuit controls the at least two switching elements. The resonance circuit includes a coupling unit having a first inductor and a second inductor, a third inductor, and a first capacitor. The rectification circuit is configured to rectify a terminal voltage of the second inductor. The second capacitor is configured to smooth a voltage rectified by the rectification circuit. The feedback circuit is configured to detect an output current which is a current flowing between the pair of output terminals or an output voltage which is a voltage applied between the pair of output terminals, and to feedback a difference between a reference voltage and a detected voltage which is a voltage proportional to the output current or the output voltage to the control circuit. The first inductor and the second inductor are magnetically coupled. The at least two switching elements are connected in series. The at least two switching elements connected in series are electrically connected between the pair of input terminals. The third inductor is connected to a first terminal of the first inductor. The first capacitor is connected to a second terminal of the first inductor. A series circuit of the third inductor, the first inductor, and the first capacitor is connected in parallel to one of the at least two switching elements. The second capacitor is electrically connected between the pair of output terminals. The feedback circuit includes a detector configured to detect the output current or the output voltage, and an error amplifier configured to receive the detected voltage and the reference voltage and output the difference. The control circuit is configured to control the at least two switching elements such that the at least two switching elements operate separately from each other and the difference output by the error amplifier becomes zero. The control circuit is configured to change switching frequencies of the at least two switching elements from high frequencies to low frequencies, relative to one another, when the operation of the at least two switching elements is started. The control circuit is configured to control the feedback circuit such that the difference output from the error amplifier approaches zero within a period of time from a point of time at which the operation of the at least two switching elements is stopped to a point of time at which the operation of the at least two switching elements is then started.

A lighting fixture according to another aspect of the present disclosure includes a light source unit including a solid-state light-emitting element, and the lighting device. The lighting device is configured to turn on the light source unit.

BRIEF DESCRIPTION OF DRAWINGS

The figures depict one or more implementation in accordance with the present teaching, by way of example only, not by way of limitations. In the figures, like reference numerals refer to the same or similar elements where.

DESCRIPTION OF EMBODIMENTS

The below-describes embodiments relate to a lighting device and a lighting fixture using the same, and more particularly to a lighting device which turns on a light source unit equipped with a solid-state light-emitting element, and to a lighting fixture using the lighting device.

Embodiment 1

Figure 1:
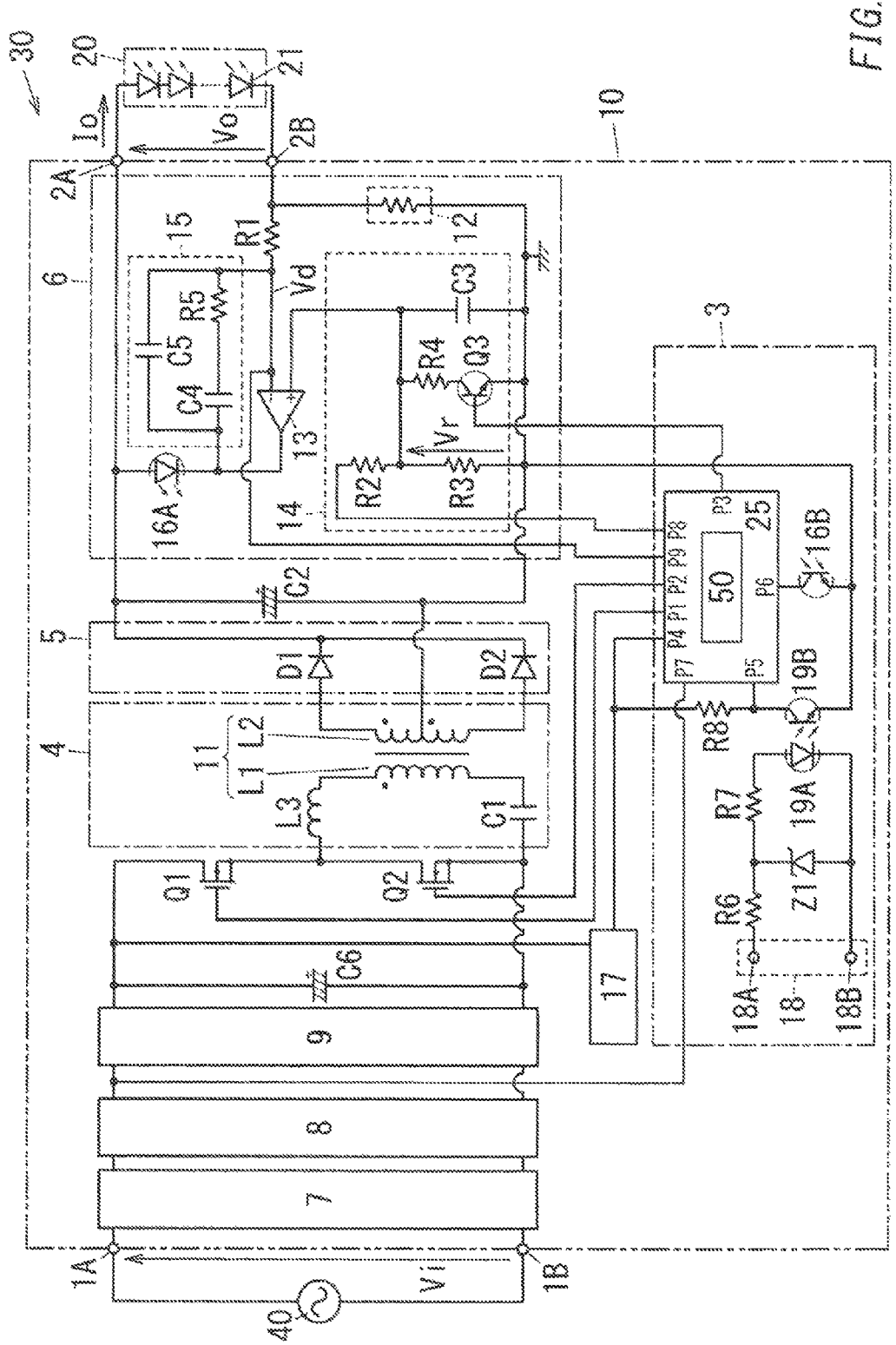
FIG. 1 is a circuit diagram of a lighting fixture equipped with a lighting device of Embodiment 1.

A lighting device 10 of Embodiment 1 is described hereinbelow with reference to FIG. 1.

The lighting device 10 is configured to turn on a light source unit 20.

The light source unit 20 includes, for example, a plurality of solid-state light-emitting elements 21. Each of the plurality of solid-state light-emitting elements 21 is, for example, a light-emitting diode (LED). The electric connection of the plurality of solid-state light-emitting elements 21 is, for example, a series connection. The color of the light emitted by the plurality of solid-state light-emitting elements 21 is, for example, white color.

In the light source unit 20, the color of the light emitted by the plurality of solid-state light-emitting elements 21 is white color, but this color is not limiting as other colors may equally be utilized. Further, in the light source unit 20, the electric connection of the plurality of solid-state light-emitting elements 21 is a series connection, but such a connection is not limiting. For example, a parallel connection may be used or a combination of series connection and parallel connection may be used. Further, the light source unit 20 includes LEDs as the solid-state light-emitting elements 21, but such a configuration is not limiting, and semiconductor laser elements or organic electroluminescence elements may be also used, for example. Further, the light source unit 20 includes a plurality of solid-state light-emitting elements 21, but may include only one such element.

The lighting device 10 includes a pair of input terminals 1A, 1B, a pair of output terminals 2A, 2B, two switching elements Q1, Q2, a control circuit 3, and a resonance circuit 4.

An external power source 40 is electrically connected between the pair of input terminals 1A, 1B. The external power source 40 is configured to output, for example, AC voltage. The external power source 40 is, for example, a commercial power source. The lighting device 10 does not include the external power source 40 as a constituent element.

A light source unit 20 is electrically connected between the pair output terminals 2A, 2B. The lighting device 10 does not include the light source unit 20 as a constituent element.

The switching element Q1 has a first terminal, a second terminal, and a control terminal. The switching element Q1 is, for example, a depletion-type n-channel metal-oxide-semiconductor field-effect transistor (MOSFET). In the switching element Q1, the first terminal is a drain terminal, the second terminal is a source terminal, and the control terminal is a gate terminal.

The drain terminal of the switching element Q1 is electrically connected to the input terminal 1A. The source terminal of the switching element Q1 is electrically connected to the switching element Q2. The gate terminal of the switching element Q1 is electrically connected to the control circuit 3 (a first terminal P1 of a control unit 25).

The switching element Q2 has a first terminal, a second terminal, and a control terminal. The switching element Q2 is, for example, a depletion-type n-channel MOSFET. In the switching element Q2, the first terminal is a drain terminal, the second terminal is a source terminal, and the control terminal is a gate terminal.

The drain terminal of the switching element Q2 is electrically connected to the source terminal of the switching element Q1. The source terminal of the switching element Q2 is electrically connected to the input terminal 1B. The gate terminal of the switching element Q2 is electrically connected to the control circuit 3 (a second terminal P2 of the control unit 25).

The switching element Q1 is a depletion-type n-channel MOSFET, but may be an enhancement-type n-channel MOSFET. The switching element Q2 is a depletion-type n-channel MOSFET, but may be an enhancement-type n-channel MOSFET. Further, the switching element Q1 and the switching element Q2 are each an n-channel MOSFET, but they may be p-channel MOSFETs.

The control circuit 3 is configured to control the two switching elements Q1, Q2. The control circuit 3 is described hereinbelow in greater detail.

The resonance circuit 4 includes a coupling unit 11 having an inductor (first inductor) L1 and an inductor (second inductor) L2, an inductor (third inductor) L3, and a capacitor (first capacitor) C1. The inductor L1 and the inductor L2 are magnetically coupled.

The coupling unit 11 is, for example, a transformer. In the coupling unit 11, the inductor L1 is a primary winding, and the inductor L2 is a secondary winding. The inductor L2 is provided with a tap (more specifically, a center tap). The coupling unit 11 is a transformer, but is not limited thereto. The coupling unit 11 may have any configuration in which two inductors are magnetically coupled.

A first terminal of the inductor L1 is electrically connected through the inductor L3 to the drain terminal of the switching element Q2. A second terminal of the inductor L1 is electrically connected through the capacitor C1 to the source terminal of the switching element Q2. A series circuit of the inductor L3, the inductor L1, and the capacitor C1 is connected in parallel with the switching element Q2, but alternatively may be connected in parallel with the switching element Q1.

The lighting device 10 further includes a rectification circuit (first rectification circuit) 5, a capacitor (second capacitor) C2, and a feedback circuit 6.

The rectification circuit 5 is configured to rectify the terminal voltage of the inductor L2. The rectification circuit 5 is configured, for example, such as to perform full-wave rectification of the terminal voltage of the inductor L2. The rectification circuit 5 includes, for example, two diodes D1, D2.

An anode of the diode D1 is electrically connected to a first terminal of the inductor L2. A cathode of the diode D1 is electrically connected to a cathode of the diode D2. An anode of the diode D2 is electrically connected to a second terminal of the inductor L2.

The capacitor C2 is configured to smooth the voltage that has been rectified by the rectification circuit 5. Thus, the capacitor C2 is configured to smooth the voltage that has been full-wave rectified by the rectification circuit 5. The capacitor C2 is, for example, an electrolytic capacitor.

A high-potential-side terminal of the capacitor C2 is electrically connected to cathodes of the diode D1 and the diode D2 (that is, to an output terminal of the rectification circuit 5 on a high potential side). Further, the high-potential-side terminal of the capacitor C2 is electrically connected to the output terminal 2A. A low-potential-side terminal of the capacitor C2 is electrically connected to the tap of the inductor L2 (that is, to an output terminal of the rectification circuit 5 on a low potential side). Further, the low-potential-side terminal of the capacitor C2 is electrically connected to the output terminal 2B. The low-potential-side terminal of the capacitor C2 is electrically connected, for example, to a circuit ground.

The feedback circuit 6 is configured to detect a current (referred to hereinbelow as "output current") Io flowing between the pair of output terminals 2A, 2B. Further, the feedback circuit 6 is configured to feedback a difference between a voltage (referred to hereinbelow as "detected voltage") Vd, which is proportional to the output current Io, and a reference voltage Vr to the control circuit 3.

The feedback circuit 6 includes, for example, a detector 12, an error amplifier 13, a generator 14 configured to generate the reference voltage Vr, a phase compensation circuit 15, a light-emitting unit 16A of a first photocoupler, and a resistor R1. The first photocoupler includes the light-emitting unit 16A and a light-receiving unit 16B. The light-emitting unit 16A is, for example, an LED. The light-receiving unit 16B is, for example, a phototransistor. In the first photocoupler, the light-emitting unit 16A and the light-receiving unit 16B are optically coupled.

The detector 12 is configured to detect (measure) the output current Io. The detector 12 is, for example, a resistor (referred to hereinbelow as "detection resistor"). A first terminal of the detection resistor is electrically connected to the output terminal 2B. A second terminal of the detection resistor is electrically connected to the low-potential-side terminal of the capacitor C2.

The error amplifier 13 is configured to receive the detected voltage Vd and the reference voltage Vr. For example, the error amplifier 13 is configured to receive the detected voltage Vd at an inverting input terminal (first input terminal) and receive the reference voltage Vr at a non-inverting input terminal (second input terminal). The inverting input terminal of the error amplifier 13 is electrically connected through a resistor R1 to the output terminal 2B. The non-inverting input terminal of the error amplifier 13 is electrically connected to the generator 14.

Further, the error amplifier 13 is configured to output a difference between the detected voltage Vd and the reference voltage Vr. An output terminal of the error amplifier 13 is electrically connected to the light-emitting unit 16A.

The generator 14 includes, for example, three resistors R2 to R4, a capacitor (third capacitor) C3, and a switching element Q3 (switch).

A first terminal of the resistor R2 is electrically connected to the control circuit 3. A second terminal of the resistor R2 is electrically connected through the resistor R3 to the low-potential-side terminal of the capacitor C2. Further, the second terminal of the resistor R2 is electrically connected to the low-potential-side terminal of the capacitor C2 through a series circuit of the resistor R4 and the switching element Q3. The second terminal of the resistor R2 is electrically connected through the capacitor C3 to the low-potential-side terminal of the capacitor C2. The second terminal of the resistor R2 is electrically connected to the non-inverting input terminal of the error amplifier 13.

In the lighting device 10, a series circuit of the resistor R2 and the resistor R3 constitutes a resistive voltage-dividing circuit (referred to hereinbelow as "first resistive voltage-dividing circuit"), and the terminal voltage of the capacitor C3 is input as the reference voltage Vr to the non-inverting input terminal of the error amplifier 13. Further, in the lighting device 10, the resistors R2, R3 and the capacitor C3 constitute a time-constant circuit. The time-constant circuit is configured to increase gradually the voltage level (terminal voltage of the capacitor C3) of the reference voltage Vr.

The switching element Q3 has a first terminal, a second terminal, and a control terminal. The switching element Q3 is, for example, a bipolar transistor. In the switching element Q3, the first terminal is a collector terminal, the second terminal is an emitter terminal, and the control terminal is a base terminal.

The collector terminal of the switching element Q3 is electrically connected to the resistor R4. The emitter terminal of the switching element Q3 is electrically connected to the low-potential-side terminal of the capacitor C2. The base terminal of the switching element Q3 is electrically connected to the control circuit 3 (third terminal P3 of the control unit 25).

The switching element Q3 is a bipolar transistor, but such a configuration is not limiting, and it may be, for example, an enhancement-type n-channel MOSFET.

The phase compensation circuit 15 is configured to compensate the phase of the difference output from the error amplifier 13. The phase compensation circuit 15 includes, for example, a resistor R5 and two capacitors C4, C5.

A first terminal of the resistor R5 is electrically connected to the inverting input terminal of the error amplifier 13. The first terminal of the resistor R5 is electrically connected through the capacitor C5 to the output terminal of the error amplifier 13. A second terminal of the resistor R5 is electrically connected through the capacitor C4 to the output terminal of the error amplifier 13.

An anode of the LED serving as the light-emitting unit 16A is electrically connected to the high-potential-side terminal of the capacitor C2. A cathode of the LED serving as the light-emitting unit 16A is electrically connected to the output terminal of the error amplifier 13.

The feedback circuit 6 is configured to detect the output current Io flowing between the pair of output terminals 2A, 2B, but such a configuration is not limiting. The feedback circuit 6 may be configured, for example, such as to detect a voltage (referred to hereinbelow as "output voltage") Vo applied between the pair of output terminals 2A, 2B. In this case, the feedback circuit 6 is configured such as to feedback the difference between the detected voltage, which is a voltage proportional to the output voltage Vo, and the reference voltage Vr to the control circuit 3. The detector 12 is configured to detect the output voltage Vo.

The lighting device 10 further includes a filter circuit 7, a rectification circuit (second rectification circuit) 8, a power factor improvement circuit 9, a capacitor (fourth capacitor) C6, and a power source circuit 17.

The filter circuit 7 is configured to remove noise. The filter circuit 7 is configured, for example, to remove noise (switching noise) leaking from the switching element Q1 to the external power source 40. Further, the filter circuit 7 is configured, for example, to remove noise (switching noise) leaking from the switching element Q2 to the external power source 40. Further, the filter circuit 7 is configured, for example, to remove noise included in the AC voltage from the external power source 40. The filter circuit 7 includes a pair of input terminals and a pair of output terminals.

The pair of input terminals of the filter circuit 7 is electrically connected to the pair of input terminals 1A, 1B. The pair of output terminals of the filter circuit 7 is electrically connected to the rectification circuit 8.

The rectification circuit 8 is configured to rectify the AC voltage input to the pair of input terminals 1A, 1B. The rectification circuit 8 is configured, for example, to full-wave rectify the AC voltage input to the pair of input terminals 1A, 1B. More specifically, the rectification circuit 8 is configured to full-wave rectify the AC voltage which has been input to the pair of input terminals 1A, 1B and from which noise has been removed by the filter circuit 7. The rectification circuit 8 is, for example, a diode bridge.

A pair of input terminals of the rectification circuit 8 is electrically connected to the pair of output terminals of the filter circuit 7. A pair of output terminals of the rectification circuit 8 is electrically connected to the power factor improvement circuit 9.

The power factor improvement circuit 9 is configured to improve the power factor of the voltage rectified by the rectification circuit 8. Thus, the power factor improvement circuit 9 is configured to improve the power factor of the voltage which has been full-wave rectified by the rectification circuit 8. The power factor improvement circuit 9 includes a pair of input terminals and a pair of output terminals.

The pair of input terminals of the power factor improvement circuit 9 is electrically connected to the pair of output terminals of the rectification circuit 8. A capacitor C6 is electrically connected between the pair of output terminals of the power factor improvement circuit 9.

The capacitor C6 is configured to smooth the voltage, the power factor of which has been improved by the power factor improvement circuit 9. The capacitor C6 is, for example, an electrolytic capacitor.

The two switching elements Q1, Q2 connected in series are electrically connected between the terminals of the capacitor C6.

The power source circuit 17 is configured to generate a first DC voltage. The power source circuit 17 is configured, for example, to generate the first DC voltage by using the terminal voltage of the capacitor C6 as a power source. Further, the power source circuit 17 is configured to output the first DC voltage to the control circuit 3. The first DC voltage is a voltage (operation voltage) that causes the control circuit 3 (control unit 25) to operate. The power source circuit 17 is configured to maintain outputting the first DC voltage to the control circuit 3 for a prescribed time period (for example, at least a predetermined period of time to be timed by a timer 50 described later) even when the power supply from the external power source 40 to the lighting device 10 is shut off. In the lighting device 10, for example, a commercially-available power source intelligent power device (IPD) manufactured by Panasonic is used as the power source circuit 17. Further, in the lighting device 10 the power source IPD manufactured by Panasonic is used as the power source circuit 17, but such a configuration is not limiting, and for example, a back converter or a fly-back converter may be used. Further, the power source circuit 17 is configured to generate the first DC voltage by using the terminal voltage of the capacitor C6 as a power source, but such a configuration is not limiting.

As mentioned hereinabove, the control circuit 3 is configured to control the two switching elements Q1, Q2. The control circuit 3 is also configured to control the feedback circuit 6.

The control circuit 3 includes, for example, a signal input unit 18, three resistors R6 to R8, a Zener diode Z1, the light-receiving unit 16B of the first photocoupler, a light-emitting unit 19A of a second photocoupler, a light-receiving unit 19B of the second photocoupler, and the control unit 25. The light-emitting unit 19A is, for example, an LED. The light-receiving unit 19B is, for example, a phototransistor. In the second photocoupler, the light-emitting unit 19A and the light-receiving unit 19B are optically coupled.

The signal input unit 18 is configured, for example, to receive a dimming signal. The signal input unit 18 includes, for example, a pair of signal input terminals 18A, 18B. The pair of signal input terminals 18A, 18B is configured, for example, to receive a dimming signal from a signal generator (not shown) using a pair of signal lines as a medium. The dimming signal means a signal indicating the output of light emitted from the light source unit 20. Examples of the dimming signal include a PWM signal and a DC signal.

A first terminal of the resistor R6 is electrically connected to the signal input terminal 18A. A second terminal of the resistor R6 is electrically connected to a first terminal of the resistor R7. Further, the second terminal of the resistor R6 is electrically connected to a cathode of the Zener diode Z1. An anode of the Zener diode Z1 is electrically connected to the signal input terminal 18B. A second terminal of the resistor R7 is electrically connected to the light-emitting unit 19A.

An anode of the LED serving as the light-emitting unit 19A is electrically connected to the second terminal of the resistor R7. A cathode of the LED serving as the light-emitting unit 19A is electrically connected to the anode of the Zener diode Z1.

A first terminal of the resistor R8 is electrically connected to the power source circuit 17. The first terminal of the resistor R8 is electrically connected to a fourth terminal P4 of the control unit 25. A second terminal of the resistor R8 is electrically connected to the light-receiving unit 19B.

A collector terminal of the phototransistor serving as the light-receiving unit 19B is electrically connected to the second terminal of the resistor R8. The collector terminal of the phototransistor serving as the light-receiving unit 19B is also electrically connected to a fifth terminal P5 of the control unit 25. An emitter terminal of the phototransistor serving as the light-receiving unit 19B is electrically connected to the low-potential-side terminal of the capacitor C2.

A collector terminal of the phototransistor serving as the light-receiving unit 16B is electrically connected to a sixth terminal P6 of the control unit 25. An emitter terminal of the phototransistor serving as the light-receiving unit 16B is electrically connected to the low-potential-side terminal of the capacitor C2.

The control unit 25 is configured to control the two switching elements Q1, Q2 (control the switching operation of the two switching elements Q1, Q2). The control unit 25 is, for example, with a microcomputer (referred to hereinbelow as "first microcomputer"). The first microcomputer is provided with a non-volatile memory (e.g., RAM, ROM, etc.) that stores a program (referred to hereinbelow as "first program"). For example, operation modes for operating the two switching elements Q1, Q2 are described in the first program. The first program is configured to be executed by the microcontroller so as to cause the microcontroller to perform the operations described herein. The control unit 25 is not limited to the first microcomputer and may be, for example, a control integrated circuit (IC) including hard-wired logic for performing the described operations.

The first terminal P1 of the control unit 25 is electrically connected to the gate terminal of the switching element Q1. The second terminal P2 of the control unit 25 is electrically connected to the gate terminal of the switching element Q2. The switching element Q1 is ON/OFF switched according to the voltage (signal) input from the first terminal P1 of the control unit 25 to the gate terminal of the switching element Q1. The switching element Q2 is ON/OFF switched according to the voltage (signal) input from the second terminal P2 of the control unit 25 to the gate terminal of the switching element Q2. The fourth terminal P4 of the control unit 25 is electrically connected to the power source circuit 17. A seventh terminal P7 of the control unit 25 is electrically connected to the high-potential-side output terminal of the pair of output terminals of the rectification circuit 8. The control unit 25 is configured to detect whether or not power has been supplied from the external power source 40 to the lighting device 10 on the basis of the voltage detected at the seventh terminal P7 (power supply detection terminal).

The control unit 25 is also configured to control the feedback circuit 6.

An eighth terminal P8 of the control unit 25 is electrically connected to the first terminal of the resistor R2 in the generator 14. The third terminal P3 of the control unit 25 is electrically connected to the base terminal of the switching element Q3 in the generator 14. The switching element Q3 is ON/OFF switched according to the voltage (signal) input from the third terminal P3 of the control unit 25 to the base terminal of the switching element Q3. A ninth terminal P9 of the control unit 25 is electrically connected to the inverting input terminal (first input terminal) of the error amplifier 13.

The signal input unit 18 has a configuration including the pair of signal input terminals 18A, 18B that receive the dimming signal from the pair of signal wires, but such a configuration is not limiting. The signal input unit 18 may be also configured, for example, such as to receive the dimming signal from a remote controller using IR radiation or radio waves as a medium. More specifically, the signal input unit 18 may have a configuration including a receiving circuit that receives the dimming signal from the remote controller. In this case, the receiving circuit is preferably electrically connected to the control unit 25 not through the second photocoupler.

The control circuit 3 controls the two switching elements Q1, Q2 such that the two switching elements Q1, Q2 operate separately. Controlling the two switching elements Q1, Q2 to "operate separately" as used herein is, for example, defined as the control circuit 3 controlling the two switching elements Q1, Q2 such that the two switching elements Q1, Q2 are turned on separately. More specifically, the control circuit 3 controls the two switching elements Q1, Q2 such that the switching element Q1 and the switching element Q2 assume the ON state alternately (a state in which the switching element Q1 is ON and the switching element Q2 is OFF and a state in which the switching element Q1 is OFF and the switching element Q2 is ON are repeated alternately).

The control circuit 3 also controls the two switching elements Q1, Q2 such that the switching frequencies of the two switching elements Q1, Q2 are the same. The control circuit 3 controls the two switching elements Q1, Q2 such that both the switching elements Q1, Q2 are not in ON states. The control circuit 3 controls, for example, the two switching elements Q1, Q2 in opposite phases. The control circuit 3 may control the two switching elements Q1, Q2 such that a dead time, in which the two switching elements Q1, Q2 are OFF, is provided between a period in which one of the two switching elements Q1, Q2 is ON and a period in which the other of the two switching elements Q1, Q2 is ON. For example, when the dead time is provided, the control circuit 3 controls the two switching elements Q1, Q2 such that, turning off both the two switching elements Q1, Q2, then turning on and off the switching elements Q1, Q2, respectively, then turning off both the two switching elements Q1, Q2, then turning off and on the switching elements Q1, Q2, . . . and the like.

In the lighting device 10, when the switching element Q1 is in the ON state and the switching element Q2 is in the OFF state, an electric current flows in a path of the high-potential-side terminal of the capacitor C6, the switching element Q1, the inductor L3, the inductor L1, the capacitor C1, and the low-potential-side terminal of the capacitor C6. As a result, magnetic energy of the inductor L3 and the inductor L1 is accumulated in the lighting device 10.

In the lighting device 10, when the switching element Q1 is switched from the ON state to the OFF state and the switching element Q2 is switched from the OFF state to the ON state, a counter electromotive force is generated in the inductor L3 and the inductor L1. Where the counter electromotive force is generated in the inductor L3 and the inductor L1 in the lighting device 10, an electric current flows in a path of the inductor L3, the switching element Q2, the capacitor C1, and the inductor L1. As a result, in the lighting device 10, a voltage (induced voltage) is generated between the terminals of the inductor L2. Therefore, in the lighting device 10, when the terminal voltage of the capacitor C2 becomes equal to or higher than a lighting voltage of the light source unit 20, the light source unit 20 can be lighted up. The lighting voltage of the light source unit 20, as referred to herein, means the minimum voltage that can turn on the light source unit 20. The lighting voltage of the light source unit 20 is, for example, the sum total of forward voltages (voltages in the forward direction) in a plurality of solid-state light-emitting elements 21 when the solid-state light-emitting elements 21 are LEDs.

Further, the control circuit 3 also controls the two switching elements Q1, Q2 such that a difference output from the error amplifier 13 becomes zero (such that the detected voltage Vd approaches the reference voltage Vr). In the lighting device 10, when the difference is output from the error amplifier 13, an electric current flows in the light-emitting unit 16A. Therefore, the electric current (collector current) flowing in the collector terminal of the phototransistor serving as the light-receiving unit 16B changes. The control unit 25 controls the two switching elements Q1, Q2 such that, when the collector current changes, the difference output from the error amplifier 13 becomes zero. For example, the control circuit 3 controls the duty cycle of the switching elements Q1, Q2, and/or the dead time to vary the current flowing through the light source unit 20, thereby causing the detected voltage Vd to approach the reference voltage Vr. As a result, in the lighting device 10, the output current Io can be converted into a constant current suitable for the light source unit 20. Therefore, in the lighting device 10, it is possible, for example, to suppress flickering of the light emitted from the light source unit 20. The current suitable for the light source unit 20, as referred to herein, means, for example, a current that is converted into a constant current to a degree such that a person viewing the light emitted from the light source unit 20 cannot sense the flickering of this light.

The control circuit 3 controls the two switching elements Q1, Q2 on the basis of the dimming signal input to the signal input unit 18. The control circuit 3 controls, for example, the switching frequencies of the two switching elements Q1, Q2 on the basis of the dimming signal input to the signal input unit 18. More specifically, the control unit 25 controls the switching frequencies of the two switching elements Q1, Q2 on the basis of the value of the current (collector current) flowing in the collector terminal of the phototransistor serving as the light-receiving unit 19B.

The control unit 25 controls the two switching elements Q1, Q2, for example, such that the switching frequencies of the two switching elements Q1, Q2 decrease with the decrease in the collector current of the light-receiving unit 19B. Further, the control unit 25 controls the two switching elements Q1, Q2, for example, such that the switching frequencies of the two switching elements Q1, Q2 increase with the increase in the collector current of the light-receiving unit 19B. As a result, in the lighting device 10, the value of the output current Io can be adjusted, and the light source unit 20 can be dimmed (light intensity of the light source unit 20 can be adjusted). In the memory of the first microcomputer serving as the control unit 25, a data table, in which the values of the collector current of the light-receiving unit 19B and the switching frequencies of the two switching elements Q1, Q2 are associated with each other, has been stored in advance.

The control circuit 3 also controls the generator 14 of the feedback circuit 6 on the basis of the dimming signal input to the signal input unit 18. For example, the control circuit 3 is configured to change the reference voltage Vr, which is generated by the generator 14, on the basis of the dimming signal input to the signal input unit 18. More specifically, where the collector current of the phototransistor serving as the light-receiving unit 19B changes, the control unit 25 outputs a DC voltage (referred to hereinbelow as "second DC voltage") proportional to the collector current through the eighth terminal P8 to the resistor R2 of the first resistive voltage-dividing circuit in the generator 14. For example, the control unit 25 applies the second DC voltage between the first terminal (connected to the eighth terminal P8) of the resistor R2 and the low-potential-side terminal (circuit ground) of the capacitor C2. The control unit 25 applies the second DC voltage of a value corresponding to the value of the collector current of the phototransistor serving as the light-receiving unit 19B between the first terminal of the resistor R2 and the low-potential-side terminal of the capacitor C2. As a result, the control circuit 3 can change the reference voltage Vr, which is generated by the generator 14, on the basis of the dimming signal input to the signal input unit 18. Therefore, in the lighting device 10, the output current Io can be stabilized to a constant current suitable for the light source unit 20 even when the light source unit 20 is dimmed.

As described hereinabove, the control unit 25 controls the two switching elements Q1, Q2 such that the detected voltage Vd (which relates to the light output from the light source unit 20) approaches the reference voltage Vr (which is set on the basis of the dimming signal). Therefore, the light at a level indicated by the dimming signal is emitted from the light source unit 20.

When the control circuit 3 of the present embodiment starts the operation of the two switching elements Q1, Q2 (switching operation), the control circuit 3 of the present embodiment changes the switching frequencies of the two switching elements Q1, Q2 from high frequencies to low frequencies, relative to one another. More specifically, the control circuit 3 controls the generator 14 of the feedback circuit 6 such that the voltage level of the reference voltage Vr gradually increases when the operation of the two switching elements Q1, Q2 is started.

When the control unit 25 starts the operation of the two switching elements Q1, Q2, the control unit 25 outputs the second DC voltage to the resistor R2 and controls the switching element Q3 such that the switching element Q3 assumes the OFF state. In the generator 14, the voltage level of the reference voltage Vr gradually increases according to a time constant determined by the resistors R2, R3 and the capacitor C3 (resistance values of the resistors R2, R3 and the capacitance of the capacitor C3) in the time constant circuit.

For example the control unit 25 starts the output of the second DC voltage to the resistor R2 simultaneously with starting the operation of the two switching elements Q1, Q2 and controls the switching element Q3 such that the switching element Q3 assumes the OFF state. As a result, the voltage level of the reference voltage Vr (terminal voltage of the capacitor C3), for example, gradually increases from zero.

In a state with a relatively low voltage level of the reference voltage Vr, the control unit 25 is configured to operate the two switching elements Q1, Q2 with relatively high switching frequencies in order to lower the level of current flowing in the light source unit 20 (lower the level of the detected voltage Vd). Meanwhile, in a state with a relatively high voltage level of the reference voltage Vr, the control unit 25 is also configured to operate the two switching elements Q1, Q2 with relatively low switching frequencies in order to increase the level of current flowing in the light source unit 20 (increase the level of the detected voltage Vd).

Therefore, by gradually increasing the voltage level of the reference voltage Vr (changing the voltage level of the reference voltage Vr from a relatively low state to a relatively high state) when the operation of the two switching elements Q1, Q2 is started, the control circuit 3 can change the switching frequencies of the two switching elements Q1, Q2 from high frequencies to low frequencies, relative to one another. Thus, in the lighting device 10, the occurrence of ringing in the drain-source voltage of the switching elements Q1, Q2 when the operation of the two switching elements Q1, Q2 is started can be suppressed. In other words, in the lighting device 10, the occurrence of ringing in the drain-source voltage of the switching elements Q1, Q2 when the two switching elements Q1, Q2 change transiently (for example, when they are switched on) can be suppressed. As a result, in the lighting device 10, the application of excess stresses to the two switching elements Q1, Q2 can be suppressed. The resistance values of the resistors R2, R3 and the capacitance of the capacitor C3 are set such that the voltage level of the reference voltage Vr increases gradually when the operation of the two switching elements Q1, Q2 is started.

It is preferred that the two switching elements Q1, Q2 be controlled such that each switching frequency is equal to or higher than a first resonance frequency when the control circuit 3 starts changing the switching frequencies of the two switching elements Q1, Q2. It is preferred that the two switching elements Q1, Q2 be controlled such that each switching frequency is less than the first resonance frequency and also equal to or higher than the second resonance frequency when the control circuit 3 ends changing the switching frequencies of the two switching elements Q1, Q2.

The first resonance frequency is determined by the inductance of the inductor L1 and the capacitance of the capacitor C1. For example, where the inductance of the inductor L1 is denoted by L1 and the capacitance of the capacitor C1 is denoted by C1, the first resonance frequency fr1 is represented by $fr1=1/\{2\pi(L1*C1)^{-1/2}\}$. The second resonance frequency is determined by the inductance of the inductor L1, the inductance of the inductor L3, and the capacitance of the capacitor C1. For example, where the inductance of the inductor L1 is denoted by L1, the inductance of the inductor L3 is denoted by L3, and the capacitance of the capacitor C1 is denoted by C1, the second resonance frequency fs is represented by $fs=1/[2\pi\{(L1+L3)*C1\}^{-1/2}]$.

As a result, in the lighting device 10, the occurrence of ringing in the drain-source voltage of the switching elements Q1, Q2 when the two switching elements Q1, Q2 change transiently can be suppressed even better. Therefore, in the lighting device 10, the application of excess stresses to the two switching elements Q1, Q2 can be suppressed even better.

The control circuit 3 is configured to control the feedback circuit 6 such that the voltage level of the reference voltage Vr gradually increases when the operation of the two switching elements Q1, Q2 is started, but such a configuration is not limiting. The control circuit 3 may be also configured to change the switching frequencies of the two switching elements Q1, Q2 directly (i.e., without controlling through the feedback circuit 6) from high frequencies to low frequencies, relative to one another, when the operation of the two switching elements Q1, Q2 is started.

It is preferred that the control circuit 3 be configured to discharge the electric charges accumulated in the capacitor C3 before the operation of the two switching elements Q1, Q2 is started. It is also preferred that the control circuit 3 be configured to charge the capacitor C3 when the operation of the two switching elements Q1, Q2 is started. More specifically, when stopping the operation of the two switching elements Q1, Q2, the control unit 25 stops the output of the second DC voltage to the resistor R2 and controls the switching element Q3 such that the switching element Q3 assumes the ON state. Further, when starting the operation of the two switching elements Q1, Q2, the control unit 25 outputs the second DC voltage to the resistor R2 and controls the switching element Q3 such that the switching element Q3 assumes the OFF state. As a result, the control circuit 3 can discharge the electric charges, which have accumulated in the capacitor C3, over a short period of time after the operation of the two switching elements Q1, Q2 has been stopped and before the next operation thereof is started. Therefore, in the lighting device 10, the capacitor C3 can be gradually charged and the voltage level of the reference voltage Vr can be gradually increased when the operation of the two switching elements Q1, Q2 is started. As a result, in the lighting device 10, the occurrence of ringing in the drain-source voltage of the switching elements Q1, Q2 when the two switching elements Q1, Q2 change transiently can be suppressed even better. As a consequence, in the lighting device 10, the application of excess stresses to the two switching elements Q1, Q2 can be suppressed even better. Further, in the lighting device 10, the series circuit of the resistor R4 and the switching element Q3 constitutes a discharge circuit that can discharge the electric charges accumulated in the capacitor C3.

The series circuit of the resistor R4 and the switching element Q3 is optional. The electric charges accumulated in the capacitor C3 are gradually discharged through the resistor R3 and, therefore, become almost zero over a certain period of time even when the series circuit of the resistor R4 and the switching element Q3 is not present.

In the lighting device 10 of the present embodiment, the capacitance of the capacitor C3 and the resistance of the resistor R3 are set such that the time constant of the discharge time of electric charges of the second capacitor C2 by the light source unit 20 is shorter that the time constant of the discharge time of electric charges of the third capacitor C3 by the resistor R3.

The control circuit 3 controls the feedback circuit 6 such that the difference output from the error amplifier 13 approaches zero within a period of time from the point of time at which the operation (switching operation) of the two switching elements Q1, Q2 has been stopped to the point of time at which the next operation of the two switching elements Q1, Q2 is started. For the sake of convenience of explanation, the period from the point of time at which the operation of the two switching elements Q1, Q2 has been stopped to the point of time at which the next operation of the two switching elements Q1, Q2 is started will be referred to as "first stop period of time".

The inventors have devised a lighting device of a comparative example that shares basic configuration with the lighting device 10.

The lighting device of the comparative example is provided with a control circuit different from the control circuit 3. This control circuit has the functions same as those of the control circuit 3. However, this control circuit does not have the function of controlling the feedback circuit 6 such that the difference output from the error amplifier 13 approaches zero within the first stop period of time.

Further, in addition to the abovementioned control circuit, the lighting device of the comparative example is provided with elements same as those of the lighting device 10. However, the control circuit is not provided with the series circuit of the resistor R4 and the switching element Q3. The elements of the lighting device of the comparative example which are the same as those of the lighting device 10 are assigned with the same reference numerals and the explanation thereof is herein omitted, as appropriate.

Figure 2:
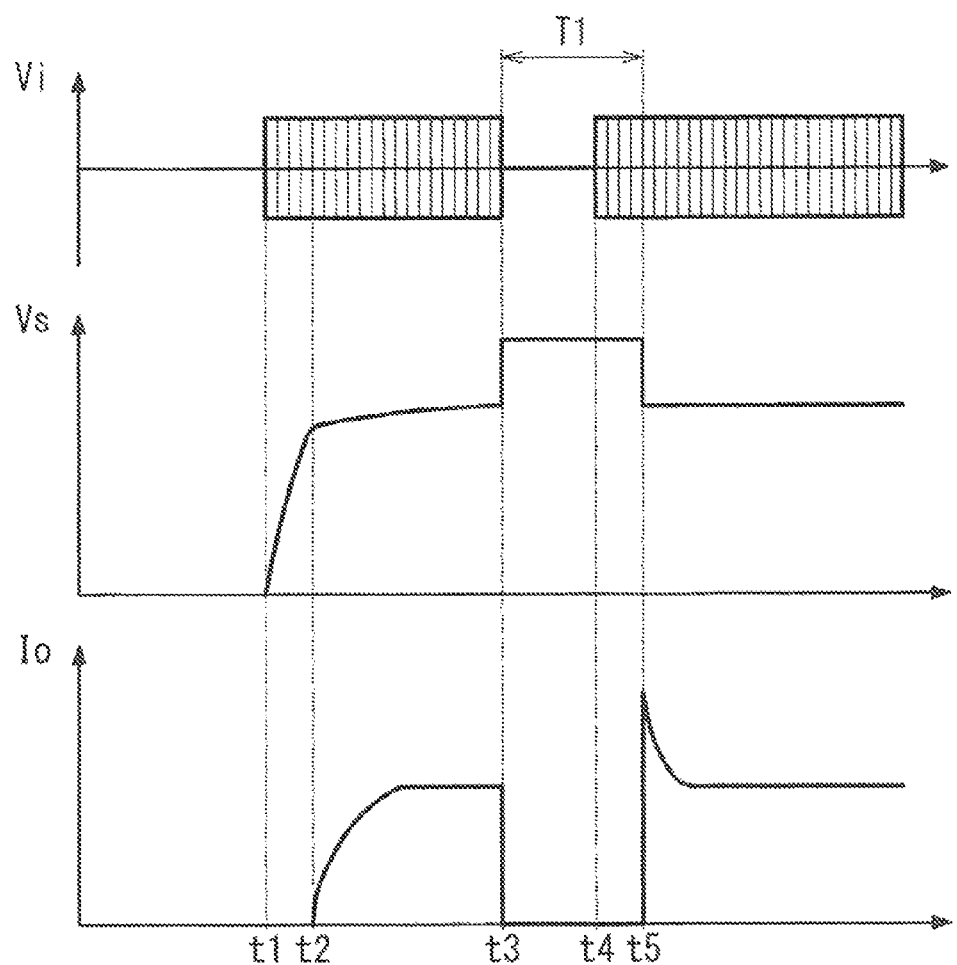
FIG. 2 is a timing chart illustrating the operation of a lighting device of a comparative example.

In the lighting device of the comparative example, where the operation of the two switching elements Q1, Q2 is stopped, the electric charges accumulated in the capacitor C2 are discharged through the light source unit 20. As a result, the terminal voltage of the capacitor C2 decreases to the lighting voltage of the light source unit 20. Therefore, the output current Io becomes zero, and the detected voltage Vd becomes 0. However, since the lighting device of the comparative example does not have the function of controlling the feedback circuit 6 within the first stop period of time, the voltage level of the reference voltage Vr is maintained at a high level (value greater than 0) for a comparatively long time. Therefore, in the lighting device of the comparative example, as depicted in FIG. 2, in the first stop period of time T1, the difference output from the error amplifier 13 becomes larger than the difference immediately before the operation of the two switching elements Q1, Q2 is stopped. As a consequence, in the lighting device of the comparative example, an overshoot occurs in the output current Io when the operation of the two switching elements Q1, Q2 is started again (point of time t5 in FIG. 2). As a result, in the lighting device of the comparative example, for example, a surge current can flow in the light source unit 20. In FIG. 2, Vi represents an AC voltage input to the pair of input terminals 1A, 1B. In FIG. 2, Vs represents the difference output from the error amplifier 13. In FIG. 2, t1 and t4 represent points of time at which the AC voltage is input to the pair of input terminals 1A, 1B. Further, t2 and t5 in FIG. 2 represent points of time at which the operation of the two switching elements Q1, Q2 is started. In FIG. 2, t3 represents a point of time at which the input of the AC voltage to the pair of input terminals 1A, 1B is stopped and a point of time at which the operation of the two switching elements Q1, Q2 is stopped. Further, Vi in FIG. 2 represents schematically the change in the AC voltage input to the pair of input terminals 1A, 1B.

Figure 3:
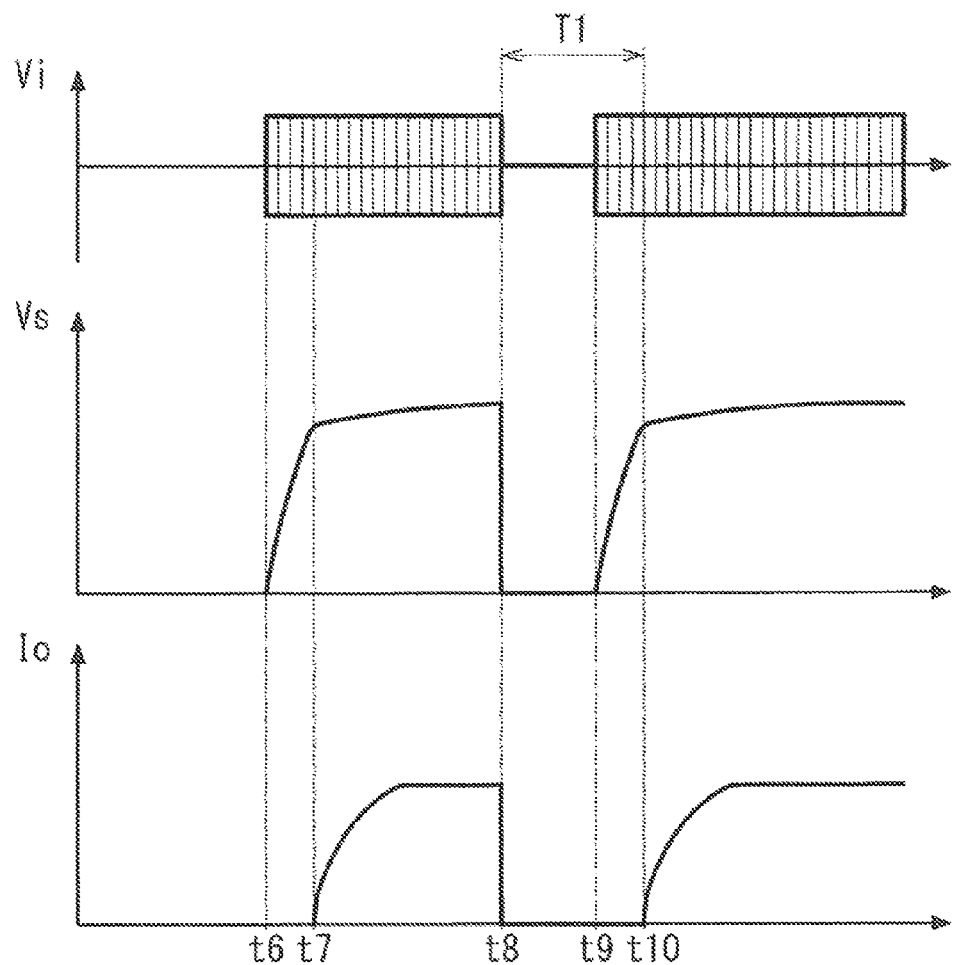
FIG. 3 is a timing chart illustrating the operation of the lighting device of Embodiment 1.

By contrast, in the control circuit 3 of the present embodiment, in the first stop period of time, the feedback circuit 6 is controlled such that the voltage level of the detected voltage Vd input to the error amplifier 13 becomes equal to or higher than the voltage level of the reference voltage Vr. More specifically, in the lighting device 10 of the present embodiment, where the operation of the two switching elements Q1, Q2 is stopped, the electric charges accumulated in the capacitor C2 are also discharged through the light source unit 20. As a result, the terminal voltage of the capacitor C2 decreases to the lighting voltage of the light source unit 20 within a short period of time. As a consequence, the output current Io becomes zero, and the detected voltage Vd also becomes zero. However, in the present embodiment, as described hereinabove, the ninth terminal P9 of the control unit 25 is electrically connected to the inverting input terminal of the error amplifier 13. Further, the control unit 25 controls the error amplifier 13 such that the voltage level of the detected voltage Vd becomes equal to or higher than the voltage level of the reference voltage Vr within the first stop period of time. More specifically, the control unit 25 controls the error amplifier 13 such that the voltage level of the detected voltage Vd becomes equal to or higher than the voltage level of the reference voltage Vr by applying a voltage to the inverting input terminal of the error amplifier 13 through the ninth terminal P9. As a result, in the lighting device 10, as depicted in FIG. 3, the difference output from the error amplifier 13 (the difference between the reference voltage Vr and the detected voltage Vd) can be brought close to zero within the first stop period of time T1. Therefore, in the lighting device 10, the occurrence of an overshoot in the output current Io when the operation of the two switching elements Q1, Q2 is started again can be suppressed (point of time t10 in FIG. 3). As a result, in the lighting device 10, for example, a surge current can be suppressed in the light source unit 20. In other words, in the lighting device 10, the occurrence of flashing from the light source unit 20 can be suppressed. In FIG. 3, Vi represents the AC voltage input to the pair of input terminals 1A, 1B. Further, Vs in FIG. 3 represents the difference output from the error amplifier 13. In FIG. 3, t6 and t9 represent points of time at which the AC voltage is input to the pair of input terminals 1A, 1B. Further, t7 and t10 in FIG. 3 represent points of time at which the operation of the two switching elements Q1, Q2 is started. In FIG. 3, t8 represents a point of time at which the input of the AC voltage to the pair of input terminals 1A, 1B is stopped and a point of time at which the operation of the two switching elements Q1, Q2 is stopped. Further, Vi in FIG. 3 represents schematically the change in the AC voltage input to the pair of input terminals 1A, 1B. The occurrence of flashing from the light source unit 20, as referred to herein, means that the light source unit 20 is fully lighted only instantaneously.

The control circuit 3 of the present embodiment is configured such that, for example, the operation of the switching elements Q1, Q2 is stopped when the supply of power from the external power source 40 to the lighting device 10 is cut off. For example, the control circuit 3 is configured such that where it is detected that the voltage detected at the seventh terminal P7 is zero, it is determined that the supply of power from the external power source 40 to the lighting device 10 has been cut off and the operation of the switching elements Q1, Q2 is stopped. Further, the control circuit 3 controls the feedback circuit 6 such that the difference output from the error amplifier 13 approaches zero (in the present embodiment, because a voltage is applied to the inverting input terminal of the error amplifier 13 through the ninth terminal P9).

As a result, in the lighting device 10, when the operation of the switching elements Q1, Q2 is stopped, it is possible to bring instantaneously (regardless of the duration of the period of time required to discharge the capacitor C3) the difference output from the error amplifier 13 close to zero. Therefore, in the lighting device 10, the occurrence of flashing from the light source unit 20 can be suppressed by stopping the operation of the switching elements Q1, Q2 and bring the difference output from the error amplifier 13 close to zero when the supply of power from the external power source 40 is cut off even when, for example, instantaneous power failure occurs.

The control circuit 3 (more specifically, the control unit 25) includes a timer 50 configured to time a predetermined period of time. Further, the control circuit 3 is configured such that where the operation of the two switching elements Q1, Q2 has been stopped, the operation of the two switching elements Q1, Q2 is started after the predetermined period of time has been timed by the timer 50. In other words, the control circuit 3 may be configured so that restart of the operation of the two switching elements Q1, Q2 is forbidden until the timer 50 times the predetermined period of time. The predetermined period of time is set to a period of time from a point of time at which the operation of the two switching elements Q1, Q2 has been stopped to a point of time at which the difference output from the error amplifier 13 becomes less than a preset specific value. The specific value is set, for example, such that the difference output from the error amplifier 13 becomes less than the difference immediately before the operation of the two switching elements Q1, Q2 is stopped. More specifically, where the operation of the two switching elements Q1, Q2 is stopped, the terminal voltage of the capacitor C2 gradually decreases through the light source unit 20, and the terminal voltage of the capacitor C3 also gradually decreases (with a time constant larger than the time constant of the discharge time of the capacitor C2) through the resistor R3. Therefore, when the feedback circuit 6 is not controlled such that the difference output from the error amplifier 13 approaches zero, the difference output from the error amplifier 13 gradually increases till the terminal voltage of the capacitor C2 decreases to the lighting voltage of the light source unit 20, and then gradually decreases. In such a case, the predetermined period of time is set to a period of time from the point of time at which the operation of the two switching elements Q1, Q2 is stopped to a point of time at which the difference output from the error amplifier 13 becomes less than the specific value. As a result, in the lighting device 10, the occurrence of an overshoot in the output current Io when the operation of the two switching elements Q1, Q2 is restarted can be suppressed even better. Therefore, in the lighting device 10, for example, the surge current in the light source unit 20 can be suppressed even better. In other words, in the lighting device 10, the occurrence of flashing from the light source unit 20 can be suppressed even better.

The control circuit 3 (control unit 25) may be configured such as to end the operation of applying a voltage to the inverting input terminal of the error amplifier 13 when the predetermined period of time is timed by the timer 50. In other words, at a point of time at which the predetermined period of time is timed by the timer 50, it is assumed that the electric charges accumulated in the capacitor C3 have been sufficiently discharged. Therefore, at this point of time, the difference output by the error amplifier 13 becomes substantially zero even when no voltage is applied to the inverting input terminal of the error amplifier 13.

The control circuit 3 includes the timer 50, but may not include the timer 50 in a different embodiment. In this case, the control circuit 3 may be configured such that, when the operation of the two switching elements Q1, Q2 is stopped, the operation of the two switching elements Q1, Q2 is started after the difference output by the error amplifier 13 becomes equal to or less than the specific value. In other words, the control circuit 3 may be configured so that restart of the operation of the two switching elements Q1, Q2 is forbidden until the difference output by the error amplifier 13 becomes equal to or less than specific value. More specifically, when the operation of the two switching elements Q1, Q2 is stopped, the control unit 25 starts the operation of the two switching elements Q1, Q2 after the collector current of the light-receiving unit 16B becomes equal to or less than the specific value. As a result, in the lighting device 10, in the same manner as when the control circuit 3 includes the timer 50, the occurrence of an overshoot in the output current Io when the operation of the two switching elements Q1, Q2 is restarted can be suppressed even better. Therefore, in the lighting device 10, for example, the surge current in the light source unit 20 can be suppressed even better. In other words, in the lighting device 10, the occurrence of flashing from the light source unit 20 can be suppressed even better.

The rectification circuit 5 has a configuration including two diodes D1, D2 (the so-called configuration of the diode rectification system), but such a configuration is not limiting. For example, the rectification circuit 5 may have the configuration of a synchronous rectification system.

Further, the inductor L3 is configured separately from the transformer serving as the coupling unit 11, but such a configuration is not limiting. For example, the inductor L3 may be configured of a leak inductance of the transformer serving as the coupling unit 11.

The lighting device 10 has a configuration including the two switching elements Q1, Q2, but such a configuration is not limiting. For example, the lighting device 10 may has a configuration including three or more switching elements. For example, when there are three switching elements, a control circuit 3 controls such that two of the three switching elements turning on and off in phase. For example, a lighting device 10 may include four switching elements (not shown) connected in a full-bridge manner. In this case, a control circuit 3 controls the four switching elements such that diagonally positioned two switching elements are turned on and off in phase.

Further, the lighting device 10 includes the filter circuit 7, the rectification circuit 8, the power factor improvement circuit 9, and the capacitor C6, but the filter circuit 7, the rectification circuit 8, the power factor improvement circuit 9, and the capacitor C6 may be omitted as will be appreciated. In such case, the external power source 40 is configured to output a DC voltage.

As described hereinabove, the lighting device 10 of the present embodiment includes the pair of input terminals 1A, 1B, the pair of output terminals 2A, 2B, at least two switching elements Q1, Q2, the control circuit 3, the resonance circuit 4, the rectification circuit 5, and the feedback circuit 6. The control circuit 3 is configured to control the two switching elements Q1, Q2. The resonance circuit 4 includes the coupling unit 11 having the first inductor L1 and the second inductor L2, the third inductor L3, and the first capacitor C1. The rectification circuit 5 is configured to rectify the terminal voltage of the second inductor L2. The second capacitor C2 is configured to smooth the voltage rectified by the rectification circuit 5. The feedback circuit 6 is configured to detect the output current Io which is the current flowing between the pair of output terminals 2A, 2B or the output voltage Vo which is the voltage applied between the pair of output terminals 2A, 2B, and to feedback, to the control circuit 3, the difference between the reference voltage Vr and the detected voltage Vd which is the voltage proportional to the output current Io or the output voltage Vo. The first inductor L1 and the second inductor L2 are magnetically coupled. The two switching elements Q1, Q2 are connected in series. The two switching elements Q1, Q2 connected in series are electrically connected between the pair of input terminals 1A, 1B. The third inductor L3 is connected to the first terminal of the first inductor L1. The first capacitor C1 is connected to the second terminal of the first inductor L1. The series circuit of the third inductor L3, the first inductor L1, and the first capacitor C1 is connected in parallel to one (Q2) of the two switching elements Q1, Q2. The second capacitor C2 is electrically connected between the pair of output terminals 2A, 2B. The feedback circuit 6 includes the detector 12 configured to detect the output current Io or the output voltage Vo, and the error amplifier 13 configured to receive the detected voltage Vd and the reference voltage Vr and output the difference. The control circuit 3 is configured to control the two switching elements Q1, Q2 such that the two switching elements Q1, Q2 operate separately from each other and the difference output from the error amplifier 13 becomes zero. The control circuit 3 is configured to change the switching frequencies of the two switching elements Q1, Q2 from high frequencies to low frequencies, relative to one another, when the operation of the two switching elements Q1, Q2 is started. The control circuit 3 is configured to control the feedback circuit 6 such that the difference output from the error amplifier 13 approaches zero within the period of time from the point of time at which the operation of the two switching elements Q1, Q2 is stopped to the point of time at which the next operation of the two switching elements Q1, Q2 is started.

As a result, in the lighting device 10, the occurrence of an overshoot in the output current Io when the operation of the two switching elements Q1, Q2 is restarted can be suppressed. Therefore, in the lighting device 10, the surge current can be suppressed.

Further, in the lighting device 10, the control circuit 3 is configured to change the switching frequencies of the two switching elements Q1, Q2 from high frequencies to low frequencies, relative to one another, when the operation of the two switching elements Q1, Q2 is started. Therefore, in the lighting device 10, the occurrence of ringing in the drain-source voltage of the switching elements Q1, Q2 when the operation of the two switching elements Q1, Q2 is started can be suppressed. As a result, in the lighting device 10, the application of excess stresses to the two switching elements Q1, Q2 can be suppressed.

As mentioned hereinabove, it is preferred that the control circuit 3 be configured to control the two switching elements Q1, Q2 with a same switching frequency. It is also preferred that the control circuit 3 be configured to control the two switching elements Q1, Q2 such that, when a change in the switching frequencies of the two switching elements Q1, Q2 from high frequencies to low frequencies, relative to one another, is started, the switching frequencies of the two switching elements Q1, Q2 become equal to or higher than the first resonance frequency. The first resonance frequency is a resonance frequency determined by the inductance of the first inductor L1 and the capacitance of the first capacitor C1. It is also preferred that the control circuit 3 be configured to control the two switching elements Q1, Q2 such that, when the change in the switching frequencies of the two switching elements Q1, Q2 from high frequencies to low frequencies, relative to one another, is ended, the switching frequencies of the two switching elements Q1, Q2 become lower than the first resonance frequency and also equal to or higher than a second resonance frequency. The second resonance frequency is a resonance frequency determined by the inductance of the first inductor L1, the inductance of the third inductor L3, and the capacitance of the first capacitor C1.

As a result, in the lighting device 10, the occurrence of ringing in the drain-source voltage of the switching elements Q1, Q2 when the operation of the two switching elements Q1, Q2 is started can be suppressed even better. As a result, in the lighting device 10, the application of excess stresses to the two switching elements Q1, Q2 can be suppressed even better.

As mentioned hereinabove, it is preferred that the control circuit 3 be configured to control the feedback circuit 6 such that, when the operation of the two switching elements Q1, Q2 is started, the voltage level of the reference voltage Vr input to the error amplifier 13 gradually increases (as an elapse of time).

As a result, in the lighting device 10, the switching frequencies of the two switching elements Q1, Q2 can be changed from high frequencies to low frequencies, relative to one another, when the operation of the two switching elements Q1, Q2 is started. Therefore, in the lighting device 10, the occurrence of ringing in the drain-source voltage of the switching elements Q1, Q2 when the operation of the two switching elements Q1, Q2 is started can be suppressed.

As mentioned hereinabove, it is preferred that the feedback circuit 6 further include the generator 14 configured to generate the reference voltage Vr. The generator 14 preferably includes the third capacitor C3. The error amplifier 13 is preferably configured to receive the terminal voltage of the third capacitor C3 as the reference voltage Vr. It is preferred that the control circuit 3 be configured to discharge electric charges, which have accumulated in the third capacitor C3, before the operation of the two switching elements Q1, Q2 is started. It is also preferred that the control circuit 3 be configured to charge the third capacitor C3 when the operation of the two switching elements Q1, Q2 is started.

For example, the series circuit of the resistor R4 and the switch (switching element Q3) is connected between terminals of the third capacitor C3. The control circuit 3 is configured to switch on the switch (switching element Q3) when the operation of the two switching elements Q1, Q2 is stopped and to switch off the switch (switching element Q3) before the operation of the two switching elements Q1, Q2 is started.

As a result, in the lighting device 10, the electric charges accumulated in the capacitor C3 can be discharged before the operation of the two switching elements Q1, Q2 is started. Therefore, in the lighting device 10, the capacitor C3 can be gradually charged and the voltage level of the reference voltage Vr can be gradually increased when the operation of the two switching elements Q1, Q2 is started. As a result, in the lighting device 10, the occurrence of ringing in the drain-source voltage of the switching elements Q1, Q2 when the operation of the two switching elements Q1, Q2 is started can be suppressed even better. Therefore, in the lighting device 10, the application of excess stresses to the two switching elements Q1, Q2 can be suppressed even better.

As mentioned hereinabove, it is preferred that the control circuit 3 be configured to control the feedback circuit 6 such that, when the operation of the two switching elements Q1, Q2 is stopped, the voltage level of the detected voltage Vd input to the error amplifier 13 becomes equal to or higher than the voltage level of the reference voltage Vr.

For example, the error amplifier 13 includes the first input terminal (inverting input terminal) that receives the detected voltage Vd and the second input terminal (non-inverting input terminal) that receives the reference voltage Vr. The control circuit 3 is configured to apply a voltage to the first input terminal of the error amplifier 13 when the operation of the two switching elements Q1, Q2 is stopped.

As a result, in the lighting device 10, the difference output from the error amplifier 13 can be made zero within a period of time from a point of time at which the operation of the two switching elements Q1, Q2 is stopped to a point of time at which the operation of the two switching elements Q1, Q2 is next started. Therefore, in the lighting device 10, the occurrence of an overshoot in the output current Io when the operation of the two switching elements Q1, Q2 is restarted can be suppressed even better. As a result, in the lighting device 10, the surge current can be suppressed even better.

As mentioned hereinabove, it is preferred that the control circuit 3 include the timer 50 configured to time the predetermined period of time. The predetermined period of time is a period of time from a point of time at which the operation of the two switching elements Q1, Q2 is stopped to a point of time at which the difference output from the error amplifier 13 becomes less than a specific value. It is also preferred that the control circuit 3 be configured to start the operation of the two switching elements Q1, Q2 after the timer 50 has timed the predetermined period of time when the operation of the two switching elements Q1, Q2 has been stopped.

As a result, in the lighting device 10, the occurrence of an overshoot in the output current Io when the operation of the two switching elements Q1, Q2 is started again after the operation of the two switching elements Q1, Q2 is stopped can be suppressed even better. Therefore, in the lighting device 10, the surge current can be suppressed even better.

The control circuit 3 is preferably configured to start the operation of the two switching elements Q1, Q2 after the difference output from the error amplifier 13 becomes equal to or less than a specific value, when the operation of the two switching elements Q1, Q2 has stopped.

As a result, in the lighting device 10, the occurrence of an overshoot in the output current Io when the operation of the two switching elements Q1, Q2 is started again after the operation of the two switching elements Q1, Q2 has been stopped can be suppressed even better. Therefore, in the lighting device 10, the surge current can be suppressed even better.

As mentioned hereinabove, it is preferred that the lighting device 10 further include the filter circuit 7, the second rectification circuit 8 different from a first rectification circuit which is the rectification circuit 5, the power factor improvement circuit 9, and the fourth capacitor C6. The filter circuit 7 is preferably configured to remove noise. The second rectification circuit 8 is preferably configured to rectify an AC voltage input to the pair of input terminals 1A, 1B. The power factor improvement circuit 9 is preferably configured to improve the power factor of the voltage rectified by the second rectification circuit 8. The fourth capacitor C6 is preferably configured to smooth the voltage, the power factor of which has been improved by the power factor improvement circuit 9. The filter circuit 7 is preferably electrically connected to the pair of input terminals 1A, 1B. The filter circuit 7 is preferably electrically connected to the second rectification circuit 8. The two switching elements Q1, Q2 connected in series are preferably electrically connected between terminals of the fourth capacitor C6.

As a result, an AC power source can be used as the external power source 40 in the lighting device 10. Further, since the lighting device 10 is provided with the filter circuit 7, for example, the noise leaking from the switching element Q1 and the switching element Q2 to the external power source 40 can be removed and reliability can be improved.

As mentioned hereinabove, in the lighting device 10, the feedback circuit 6 preferably further includes the generator 14 configured to generate the reference voltage Vr. The generator 14 preferably includes a parallel circuit of the third capacitor C3 and the resistor R3. The error amplifier 13 preferably includes the first input terminal that receives the detected voltage Vd and the second input terminal connected to the first terminal of the parallel circuit. The second terminal of the parallel circuit is preferably connected to a circuit ground. The time constant of a discharge time of electric charges of the second capacitor C2 by the light source unit 20 is preferably less than a time constant of a discharge time of electric charges of the third capacitor C3 by the resistor R3.

Figure 4:
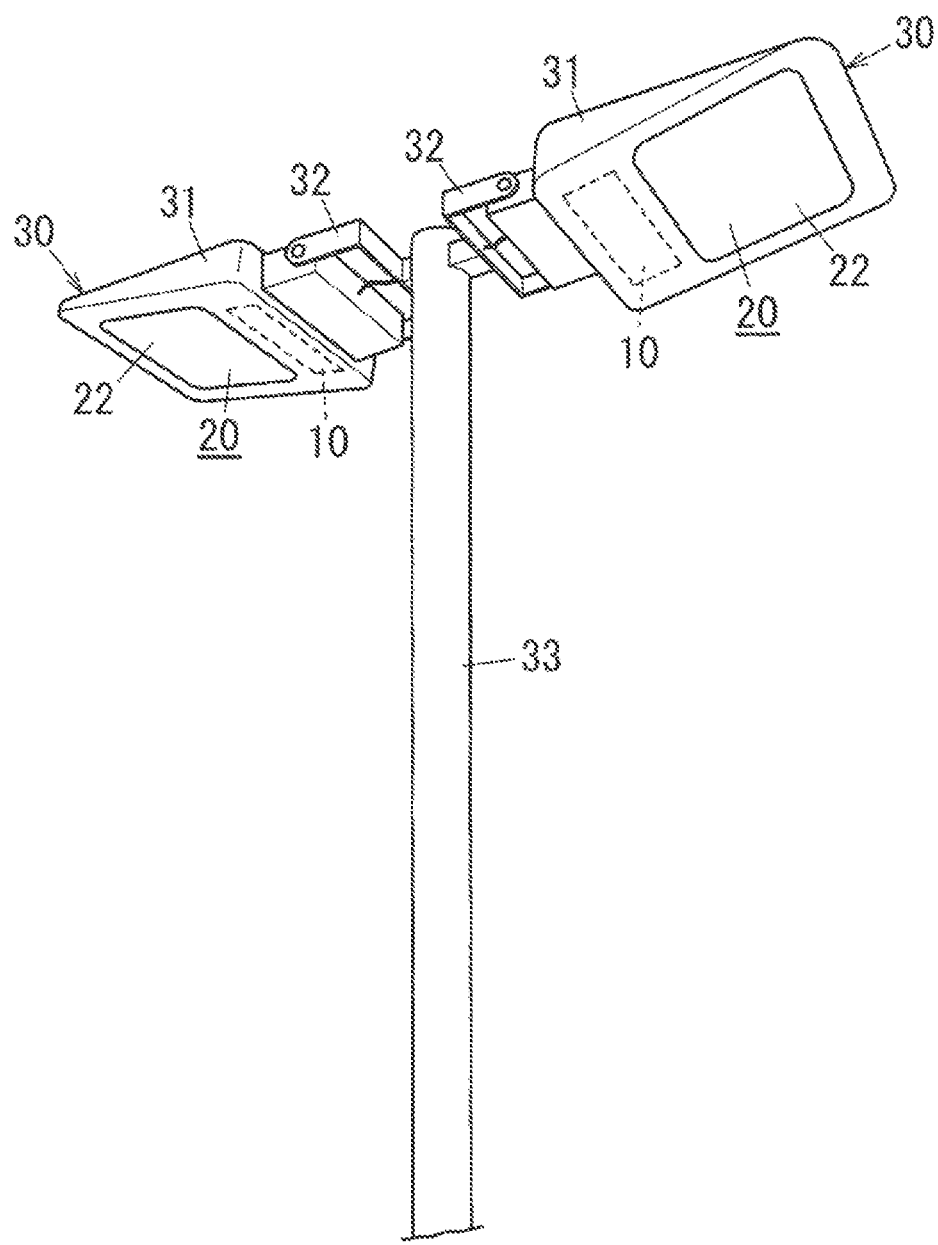
FIG. 4 is a partially cut-out perspective view illustrating an installation state of the lighting fixture equipped with the lighting device of Embodiment 1.

A lighting fixture 30 equipped with the lighting device 10 will be explained hereinbelow with reference to FIG. 4.

The lighting fixture 30 is, for example, a street lamp for illuminating a road, or the like, in the nighttime. The lighting fixture 30 is mounted on a pole 33 by using an arm 32.

The arm 32 holds the lighting fixture 30. The arm 32 is mounted on the pole 33. The arm 32 is formed, for example, from a metal.

The pole 33 is configured, for example, in a columnar shape. The pole 33 is also configured such that the arm 32 be mounted thereon. The pole 33 is formed, for example, from a metal. The pole 33 is arranged, for example, at a road, or the like.

The lighting fixture 30 includes, for example, the light source unit 20, the lighting device 10, and a fixture main body 31.

The light source unit 20 includes a cover 22 transmitting the light emitted from the plurality of solid-state light-emitting elements 21.

The cover 22 is formed as a plate. The cover 22 is formed, for example, from glass. The cover 22 is formed from glass, but such a configuration is not limiting, and the cover may be formed, for example, from a synthetic resin.

The light source unit 20 and the lighting device 10 are mounted on the fixture main body 31. The fixture main body 31 holds the cover 22. The fixture main body 31 is formed, for example, from a metal.

The lighting fixture 30 is not limited to the outdoor lighting fixture, such as a street lamp, but may be an indoor lighting fixture such as a ceiling light, spot light, and down light.

The lighting fixture 30 of the above-described present embodiment includes the light source unit 20, which is provided with the solid-state light-emitting elements 21, and the lighting device 10. The lighting device 10 is configured to turn on the light source unit 20.

As a result, it is possible to provide the lighting fixture 30 equipped with the lighting device 10 such that the flow of a surge current in the lighting fixture 30 can be controlled.

Embodiment 2

A lighting device 10A of Embodiment 2 will be described hereinbelow with reference to FIG. 5.

Figure 5:
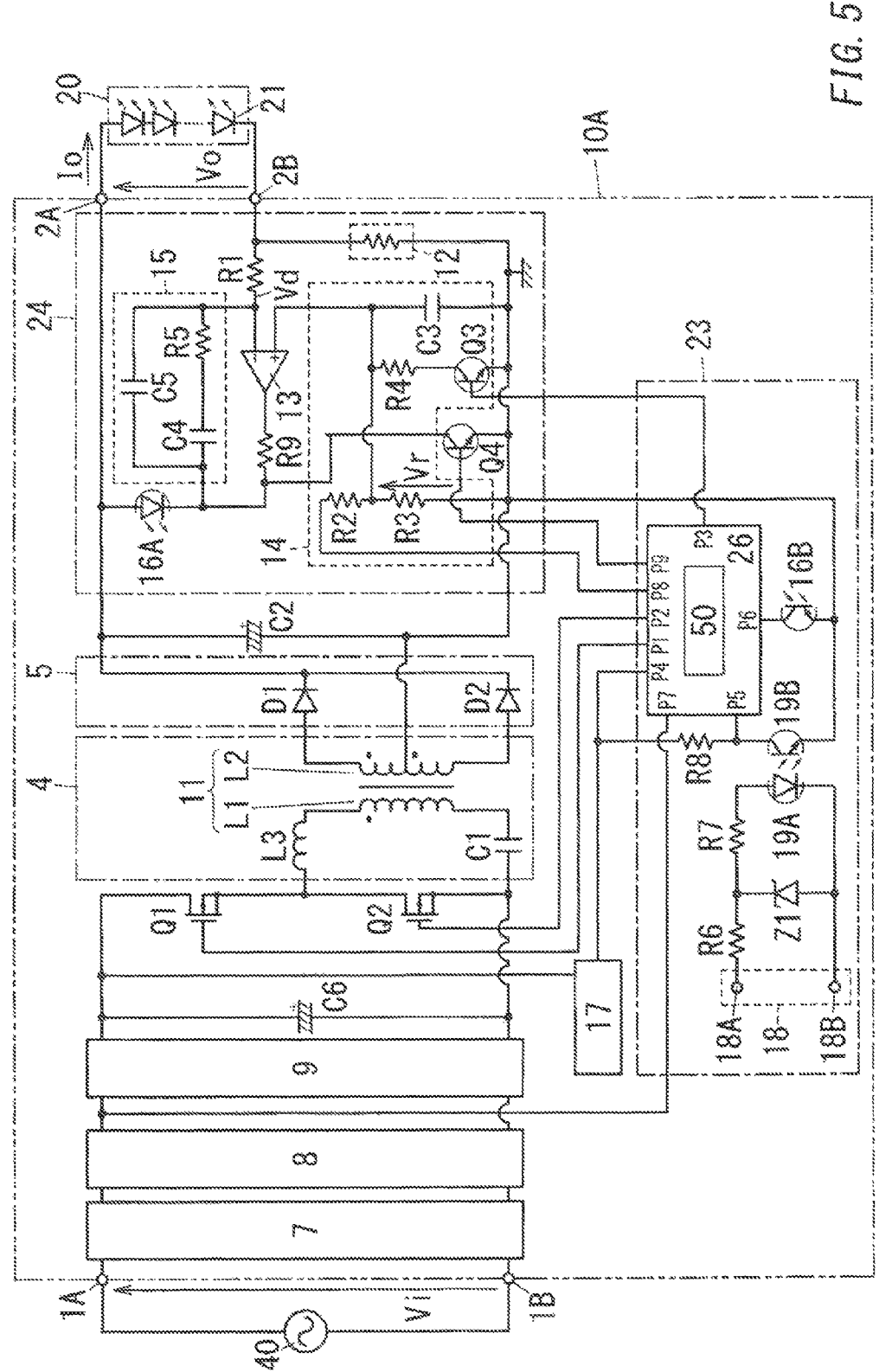
FIG. 5 is a circuit diagram of the lighting fixture equipped with a lighting device of Embodiment 2.

The basic configuration of the lighting device 10A of Embodiment 2 is the same as that of the lighting device 10 of Embodiment 1, the difference being that, for example, the lighting device 10 of the present embodiment includes a control circuit 23, which differs from the control circuit 3 in the lighting device 10 of Embodiment 1, as depicted in FIG. 5. In the lighting device 10A, the elements same as those of the lighting device 10 are assigned with the same reference numerals and the explanation thereof is herein omitted as appropriate.

Similarly to the lighting device 10 of Embodiment 1, the lighting device 10A of the present embodiment is configured to turn on a light source unit 20. Further, the lighting device 10A of the present embodiment includes a feedback circuit 24 different from the feedback circuit 6 in the lighting device 10.

The control circuit 23 is configured to control the two switching elements Q1, Q2. The control circuit 23 is also configured to control the feedback circuit 24. The control circuit 23 includes a control unit 26 instead of the control unit 25 in the lighting device 10.

Again, the control unit 26 is configured to control two switching elements Q1, Q2. The control unit 26 is, for example, a microcomputer (referred to hereinbelow as "second microcomputer"). The second microcomputer is provided with a memory that stores a program (referred to hereinbelow as "second program"). For example, operation modes for operating the two switching elements Q1, Q2 are described in the second program. The control unit 26 is not limited to the second microcomputer and may be, for example, a control IC.

A first terminal P1 of the control unit 26 is electrically connected to a gate terminal of the switching element Q1. A second terminal P2 of the control unit 26 is electrically connected to a gate terminal of the switching element Q2. A third terminal P3 of the control unit 26 is electrically connected to a base terminal of a switching element Q3. A fourth terminal P4 of the control unit 26 is electrically connected to a power source circuit 17. A fifth terminal P5 of the control unit 26 is electrically connected to a collector terminal of a phototransistor serving as a light-receiving unit 19B. A sixth terminal P6 of the control unit 26 is electrically connected to a collector terminal of a phototransistor serving as a light-receiving unit 16B. A seventh terminal P7 of the control unit 26 is electrically connected to a high-potential-side output terminal of a pair of output terminals of a rectification circuit 8.

The feedback circuit 24 is configured to detect an output current Io. Further, the feedback circuit 24 is configured to feedback a difference between a detected voltage Vd and a reference voltage Vr to the control circuit 23 (more specifically, to the control unit 26).

The feedback circuit 24 includes, for example, a detector 12, an error amplifier 13, a generator 14, a phase compensation circuit 15, a light-emitting unit 16A of a first photocoupler, two resistors R1, R9, and a switching element Q4 (switch).

A first terminal of a resistor R2 in the generator 14 is electrically connected to an eighth terminal P8 of the control unit 26.

A first terminal of the resistor R9 is electrically connected to an output terminal of the error amplifier 13. A second terminal of the resistor R9 is electrically connected to a cathode of an LED serving as the light-emitting unit 16A.

The switching element Q4 has a first terminal, a second terminal, and a control terminal. The switching element Q4 is, for example, a bipolar transistor. In the switching element Q4, the first terminal is a collector terminal, the second terminal is an emitter terminal, and the control terminal is a base terminal.

The collector terminal of the switching element Q4 is electrically connected to the second terminal of the resistor R9. The emitter terminal of the switching element Q4 is electrically connected to a low-potential-side terminal of the capacitor C2 (for example, to a circuit ground). The base terminal of the switching element Q4 is electrically connected to the control circuit 23 (more specifically, a ninth terminal P9 of the control unit 26). The switching element Q4 is ON/OFF switched according to the voltage (signal) input from the ninth terminal P9 of the control unit 26 to the base terminal of the switching element Q4.

The switching element Q4 is a bipolar transistor, but such a configuration is not limiting and it may be, for example, an enhancement-type n-channel MOSFET. Further, the feedback circuit 24 is configured to detect the output current Io, but such a configuration is not limiting. The feedback circuit 24 may be configured, for example, to detect an output voltage Vo. In this case, the feedback circuit 24 is configured to feedback a difference between a detected voltage, which is the voltage proportional to the output voltage Vo, and the reference voltage Vr to the control circuit 23. The detector 12 is configured to detect the output voltage Vo.

The control unit 26 is configured to control the feedback circuit 24.

The eighth terminal P8 of the control unit 26 is electrically connected to the first terminal of the resistor R2 in the generator 14. Further, the third terminal P3 of the control unit 26 is electrically connected to the base terminal of the switching element Q3 in the generator 14.

The control circuit 23 controls the feedback circuit 24 such that the difference output from the error amplifier 13 approaches zero within the first stop period of time. The control circuit 23, for example, controls the feedback circuit 24 such that the difference output from the error amplifier 13 becomes zero within the first stop period of time.

More specifically, the ninth terminal P9 of the control unit 26 is electrically connected to the base terminal of the switching element Q4. The control unit 26 controls the switching element Q4 such that the switching element Q4 is in the ON state within the first stop period of time. As a result, the control circuit 23 can zero the difference output from the error amplifier 13 within the first stop period of time. Therefore, in the lighting device 10A, the occurrence of an overshoot in the output current Io when the operation of the two switching elements Q1, Q2 is restarted can be suppressed even better. As a result, in the lighting device 10A, for example, the surge current in the light source unit 20 can be suppressed even better. In other words, in the lighting device 10A, the occurrence of flashing from the light source unit 20 can be suppressed even better.

In addition to the function of controlling the feedback circuit 24 such that the difference output from the error amplifier 13 within the first stop period of time becomes zero, the control circuit 23 of the present embodiment has the functions same as those of the control circuit 3 of Embodiment 1. Further, the control circuit 23 (more specifically, the control unit 26) may include the timer 50 or may not include the timer 50. The control circuit 23 may be configured to end the operation of switching off (that is, switch on) the switch (switching element Q4) when the predetermined period of time is timed by the timer 50.

The lighting device 10A of the present embodiment may be used instead of the lighting device 10 of Embodiment 1 in the lighting fixture 30.

In the lighting device 10A described hereinabove, the control circuit 23 controls the feedback circuit 24 such that the difference output from the error amplifier 13 becomes zero within the period of time from the point of time at which the operation of the two switching elements Q1, Q2 is stopped to the point of time at which the operation of the two switching elements Q1, Q2 is started (restarted).

For example, the output terminal of the error amplifier 13 is connected to the circuit ground through the switch (switching element Q4). The control circuit 23 is configured to switch on the switch (switching element Q4) when the operation of the two switching elements Q1, Q2 is stopped and to switch off the switch (switching element Q4) when the operation of the two switching elements Q1, Q2 is started.

As a result, in the lighting device 10A, the occurrence of an overshoot in the output current Io when the operation of the two switching elements Q1, Q2 is started again after the operation of the two switching elements Q1, Q2 has been stopped can be suppressed even better. Therefore, in the lighting device 10A, the surge current can be suppressed even better.

Embodiment 3

A lighting device 10B of Embodiment 3 will be described hereinbelow with reference to FIG. 6.

Figure 6:
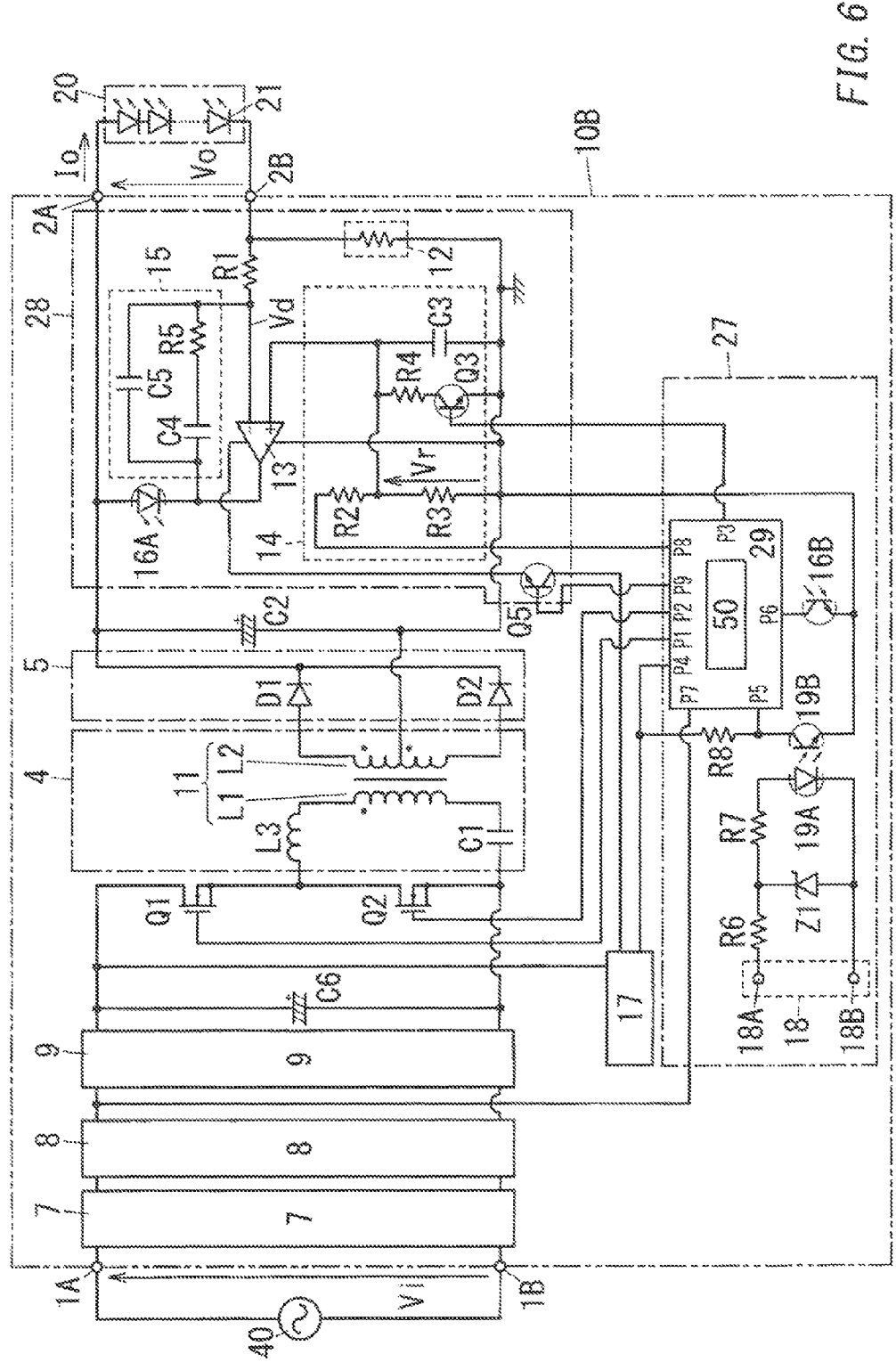
FIG. 6 is a circuit diagram of the lighting fixture equipped with a lighting device of Embodiment 3.

The basic configuration of the lighting device 10B of Embodiment 3 is the same as that of the lighting device 10 of Embodiment 1, but as depicted in FIG. 6, the difference with the lighting device 10 of Embodiment 1 is that, for example, the lighting device 10B of the present embodiment includes a control circuit 27 which is different from the control circuit 3 in the lighting device 10. Further, in the lighting device 10B, the elements same as those of the lighting device 10 are assigned with the same reference numerals and the explanation thereof is herein omitted as appropriate.

Similarly to the lighting device 10 of Embodiment 1, the lighting device 10B of the present embodiment is configured to turn on a light source unit 20. Further, the lighting device 10B of the present embodiment includes a feedback circuit 28 different from the feedback circuit 6 in the lighting device 10.

The control circuit 27 is configured to control two switching elements Q1, Q2. The control circuit 27 is also configured to control the feedback circuit 28. The control circuit 27 includes a control unit 29 instead of the control unit 25 in the lighting device 10.

The control unit 29 is configured to control the two switching elements Q1, Q2. The control unit 29 is, for example, a microcomputer (referred to hereinbelow as "third microcomputer"). Again, the third microcomputer is provided with a memory that stores a program (referred to hereinbelow as "third program"). For example, operation modes for operating the two switching elements Q1, Q2 are described in the third program. The control unit 29 is not limited to the third microcomputer and may be, for example, a control IC.

A first terminal P1 of the control unit 29 is electrically connected to a gate terminal of the switching element Q1. A second terminal P2 of the control unit 29 is electrically connected to a gate terminal of the switching element Q2. A third terminal P3 of the control unit 29 is electrically connected to a base terminal of a switching element Q3. A fourth terminal P4 of the control unit 29 is electrically connected to a power source circuit 17. A fifth terminal of the control unit 29 is electrically connected to a collector terminal of a phototransistor serving as a light-receiving unit 19B. A sixth terminal P6 of the control unit 29 is electrically connected to a collector terminal of a phototransistor serving as a light-receiving unit 16B. A seventh terminal P7 of the control unit 29 is electrically connected to a high-potential-side output terminal of a pair of output terminals of a rectification circuit 8.

The feedback circuit 28 is configured to detect an output current Io. Further, the feedback circuit 28 is configured to feedback a difference between a detected voltage Vd and a reference voltage Vr to the control circuit 27 (more specifically, to the control unit 29).

The feedback circuit 28 includes, for example, a detector 12, an error amplifier 13, a generator 14, a phase compensation circuit 15, a light-emitting unit 16A of a first photocoupler, a resistor R1, and a switching element Q5 (switch).

A first terminal of a resistor R2 in the generator 14 is electrically connected to an eighth terminal P8 of the control unit 29.

The switching element Q5 has a first terminal, a second terminal, and a control terminal. The switching element Q5 is, for example, a bipolar transistor. In the switching element Q5, the first terminal is a collector terminal, the second terminal is an emitter terminal, and the control terminal is a base terminal.

The collector terminal of the switching element Q5 is electrically connected to the power source circuit 17. The emitter terminal of the switching element Q5 is electrically connected to a power source terminal on the anode side of the error amplifier 13. The base terminal of the switching element Q5 is electrically connected to the control circuit 27 (more specifically, a ninth terminal P9 of the control unit 29). The switching element Q5 is ON/OFF switched according to the voltage (signal) input from the ninth terminal P9 of the control unit 29 to the base terminal of the switching element Q5.

A power source terminal on the cathode side of the error amplifier 13 is electrically connected to a low-potential-side terminal of a capacitor C2 (for example, to a circuit ground).

The switching element Q5 is a bipolar transistor, but such a configuration is not limiting and it may be, for example, an enhancement-type n-channel MOSFET. Further, the feedback circuit 28 is configured to detect the output current Io, but such a configuration is not limiting. The feedback circuit 28 may be configured, for example, to detect an output voltage Vo. In this case, the feedback circuit 28 is configured to feedback a difference between a detected voltage, which is the voltage proportional to the output voltage Vo, and the reference voltage Vr to the control circuit 27. The detector 12 is configured to detect the output voltage Vo.

The power source circuit 17 is configured to output a DC voltage (referred to hereinbelow as "third DC voltage"). The power source circuit 17 is configured to output the third DC voltage to the error amplifier 13 through the switching element Q5. The third DC voltage is a voltage (operation voltage) that causes the error amplifier 13 to operate.

The control unit 29 is configured to control the feedback circuit 28.

The eighth terminal P8 of the control unit 29 is electrically connected to the first terminal of the resistor R2 in the generator 14. Further, the third terminal P3 of the control unit 29 is electrically connected to the base terminal of the switching element Q3 in the generator 14.

The control circuit 27 controls the feedback circuit 28 such that the difference output from the error amplifier 13 approaches zero within the first stop period of time. The control circuit 27 is configured to, for example, cut off power supply to the error amplifier 13 within the first stop period of time.

More specifically, the ninth terminal P9 of the control unit 29 is electrically connected, for example, to the base terminal of the switching element Q5. The control unit 29 controls the switching element Q5 such that the switching element Q5 is in the OFF state within the first stop period of time. As a result, the control circuit 27 can cut off power supply to the error amplifier 13 within the first stop period of time. Therefore, the control circuit 27 can zero the difference output from the error amplifier 13 within the first stop period of time. As a result, in the lighting device 10B, the occurrence of an overshoot in the output current Io when the operation of the two switching elements Q1, Q2 is restarted can be suppressed even better. Therefore, in the lighting device 10B, for example, the surge current in the light source unit 20 can be suppressed even better. In other words, in the lighting device 10B, the occurrence of flashing from the light source unit 20 can be suppressed even better.

In addition to the function of cutting off the supply of power to the error amplifier 13 within the first stop period of time, the control circuit 27 of the present embodiment has the functions same as those of the control circuit 3 of Embodiment 1. Further, the control circuit 27 (more specifically, the control unit 29) may include the timer 50 or may not include the timer 50. The control circuit 27 may be configured to end the operation of cutting off the supply of power to the error amplifier 13 when the predetermined period of time is timed by the timer 50.

Further, the control circuit 27 of the present embodiment is configured to cut off the supply of power to the error amplifier 13 by controlling the switching element Q5, but such a configuration is not limiting. For example, the control circuit 27 may be configured to cut off the supply of power to the error amplifier 13 by controlling directly the power source circuit 17.

Further, in the lighting device 10B of the present embodiment, the power source circuit 17 is configured to be provided outside of the control circuit 27, but such a configuration is not limiting. Thus, in the lighting device 10B, the control circuit 27 may be configured to include the power source circuit 17. In this case, the power source circuit 17 is electrically connected to the high-potential-side output terminal of the pair of output terminals of the rectification circuit 8. Further, in this case, the power source circuit 17 is configured to stop the output of the third DC voltage when the voltage which has been full-wave rectified by the rectification circuit 8 becomes less than a predetermined voltage. As a result, the control circuit 27 can bring the difference output from the error amplifier 13 close to zero within the first stop period of time. As a result, in the lighting device 10B, the occurrence of an overshoot in the output current Io when the operation of the two switching elements Q1, Q2 is restarted can be suppressed. Therefore, in the lighting device 10B, for example, the surge current in the light source unit 20 can be suppressed. In other words, in the lighting device 10B, the occurrence of flashing from the light source unit 20 can be suppressed.

The lighting device 10B of the present embodiment may be used instead of the lighting device 10 of Embodiment 1 in the lighting fixture 30.

In the lighting device 10B described hereinabove, the control circuit 27 is configured to cut off the supply of power to the error amplifier 13 when the operation of the two switching elements Q1, Q2 is stopped.

As a result, in the lighting device 10B, the occurrence of an overshoot in the output current Io when the operation of the two switching elements Q1, Q2 is started again after the operation of the two switching elements Q1, Q2 has been stopped can be suppressed even better. Therefore, in the lighting device 10B, the surge current can be suppressed even better.

Embodiment 4

A lighting device 10C of Embodiment 4 will be described hereinbelow with reference to FIG. 7.

Figure 7:
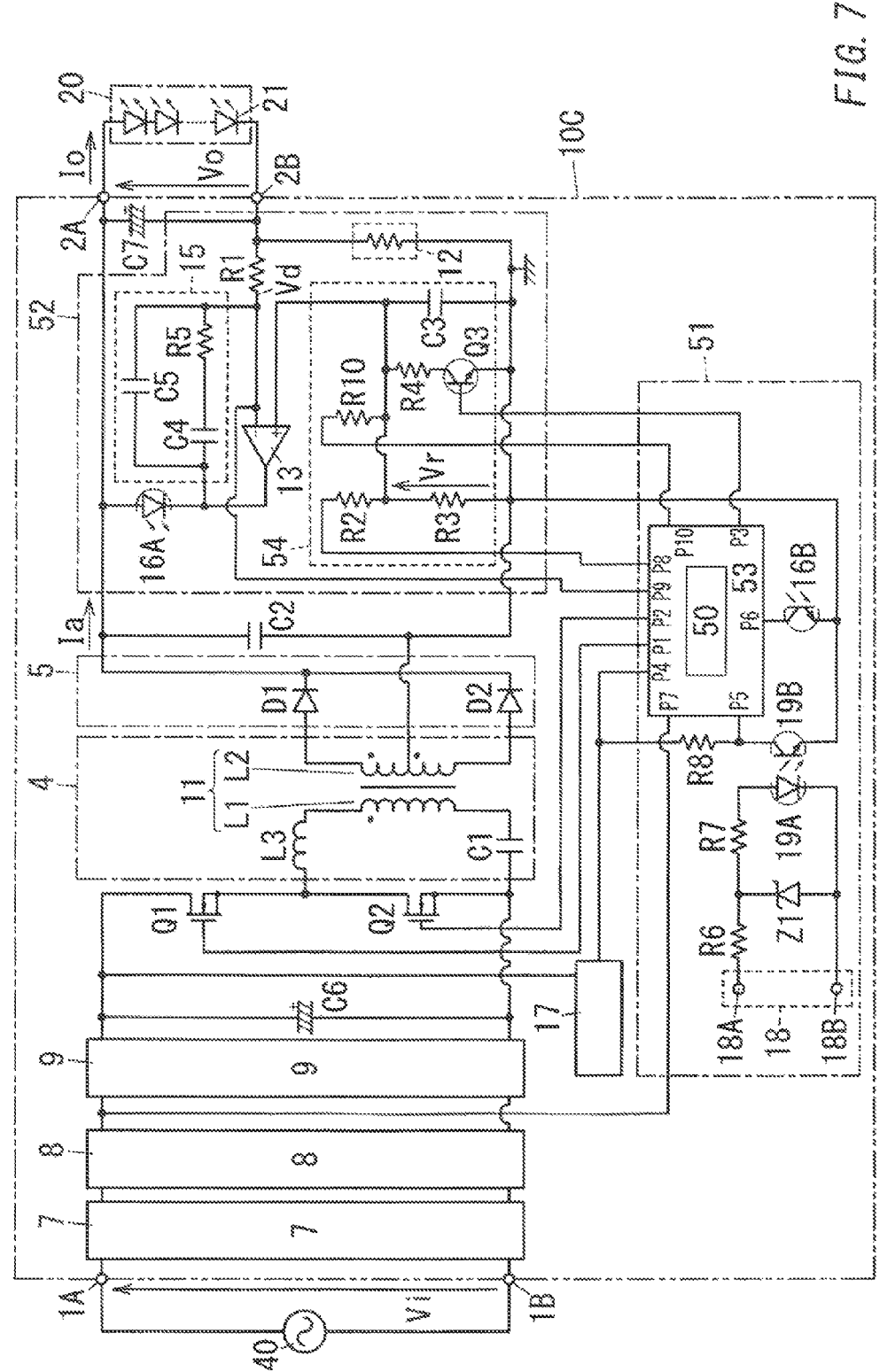
FIG. 7 is a circuit diagram of the lighting fixture equipped with a lighting device of Embodiment 4.

The basic configuration of the lighting device 10C of Embodiment 4 is the same as that of the lighting device 10 of Embodiment 1, but as depicted in FIG. 7, the difference with the lighting device 10 of Embodiment 1 is that, for example, the lighting device 10C of the present embodiment includes a control circuit 51 which is different from the control circuit 3 in the lighting device 10. Further, in the lighting device 10C, the elements same as those of the lighting device 10 are assigned with the same reference numerals and the explanation thereof is herein omitted as appropriate.

Similarly to the lighting device 10 of Embodiment 1, the lighting device 10C of the present embodiment is configured to turn on a light source unit 20. Further, the lighting device 10C of the present embodiment includes a feedback circuit 52, which is different from the feedback circuit 6 in the lighting device 10, and a capacitor C7. In the lighting device 10C, for example, a ceramic capacitor can be used instead of the electrolytic capacitor as the capacitor C2.

The control circuit 51 is configured to control two switching elements Q1, Q2. The control circuit 51 is also configured to control the feedback circuit 52. The control circuit 51 includes a control unit 53 instead of the control unit 25 in the lighting device 10.

Again, the control unit 53 is configured to control the two switching elements Q1, Q2. The control unit 53 is, for example, a microcomputer (referred to hereinbelow as "fourth microcomputer"). The fourth microcomputer is provided with a memory that stores a program (referred to hereinbelow as "fourth program"). For example, operation modes for operating the two switching elements Q1, Q2 are described in the fourth program. The control unit 53 is not limited to the fourth microcomputer and may be, for example, a control IC.

A first terminal P1 of the control unit 53 is electrically connected to a gate terminal of the switching element Q1. A second terminal P2 of the control unit 53 is electrically connected to a gate terminal of the switching element Q2. A third terminal P3 of the control unit 53 is electrically connected to a base terminal of a switching element Q3. A fourth terminal P4 of the control unit 53 is electrically connected to a power source circuit 17. A fifth terminal P5 of the control unit 53 is electrically connected to a collector terminal of a phototransistor serving as a light-receiving unit 19B. A sixth terminal P6 of the control unit 53 is electrically connected to a collector terminal of a phototransistor serving as a light-receiving unit 16B. A seventh terminal P7 of the control unit 53 is electrically connected to a high-potential-side output terminal of a pair of output terminals of a rectification circuit 8.

The feedback circuit 52 is configured to detect an output current Io. Further, the feedback circuit 52 is configured to feedback a difference between a detected voltage Vd and a reference voltage Vr to the control circuit 51 (more specifically, to the control unit 53).

The feedback circuit 52 includes, for example, a detector 12, an error amplifier 13, a phase compensation circuit 15, a light-emitting unit 16A of a first photocoupler, and a resistor R1. The feedback circuit 52 also includes a generator 54 different from the generator 14 in the lighting device 10.

A first terminal of a resistor R2 in the generator 54 is electrically connected to an eighth terminal P8 of the control unit 53.

The generator 54 of the present embodiment includes, for example, four resistors R2 to R4 and R10, a capacitor C3, and the switching element $Q^3$.

A first terminal of the resistor R10 is electrically connected to the control circuit 51 (more specifically, to a tenth terminal P10 of the control unit 53). A second terminal of the resistor R10 is electrically connected to a low-potential-side terminal of the capacitor C2 (for example, to a circuit ground) through a resistor R3.

The feedback circuit 52 is configured to detect the output current Io, but such a configuration is not limiting. For example, the feedback circuit 52 may be configured to detect an output voltage Vo. In this case, the feedback circuit 52 is configured to feedback a difference between a detected voltage, which is a voltage proportional to the output voltage Vo, and the reference voltage Vr to the control circuit 51. Further, the detector 12 is configured to detect the output voltage Vo.

The capacitor C7 is, for example, an electrolytic capacitor. A high-potential-side terminal of the capacitor C7 is electrically connected to a high-potential-side terminal of the capacitor C2. The high-potential-side terminal of the capacitor C7 is also electrically connected to an output terminal 2A. A low-potential-side terminal of the capacitor C7 is electrically connected to an inverting input terminal of the error amplifier 13 through the resistor R1. The low-potential-side terminal of the capacitor C7 is also electrically connected to the low-potential-side terminal of the capacitor C2 through the detector 12. The low-potential-side terminal of the capacitor C7 is further electrically connected to an output terminal 2B.

The control unit 53 is configured to control the feedback circuit 52.

The eighth terminal P8 of the control unit 53 is electrically connected to the first terminal of the resistor R2 in the generator 54. Further, the third terminal P3 of the control unit 53 is electrically connected to the base terminal of the switching element Q3 in the generator 54.

The control circuit 51 (more specifically, the control unit 53) controls the two switching elements Q1, Q2 such that the two switching elements Q1, Q2 operate intermittently (switching operation of the two switching elements Q1, Q2 is performed intermittently). In the intermittent operation, a time period during which both the two switching elements Q1, Q2 alternate between on and off, and a time period during which both the two switching elements Q1, Q2 are turned off, are repeated alternately. As a result, in the lighting device 10C, the electric current (peak current) flowing in the two switching elements Q1, Q2 can be made comparatively small and the output current Io can be reduced. Therefore, in the lighting device 10C, deep dimming control can be performed (the light source unit 20 can be turned on at a small light quantity) in the light source unit 20. The deep dimming control, as referred to herein, means that the two switching elements Q1, Q2 are intermittently operated such that the output level of light emitted from the light source unit 20 is, for example, within a range of 5% to 50% of the range of 0% to 100% (dimming range). Where the output level of light emitted from the light source unit 20 is 0%, it means that the light source unit 20 is not turned on (the light is turned out). Where the output level of light emitted from the light source unit 20 is 100%, it means that the light source unit 20 is fully turned on.

When the control circuit 51 (more specifically, the control unit 53) starts the intermittent operation of the two switching elements Q1, Q2, the switching frequencies of the two switching elements Q1, Q2 change from high frequencies to low frequencies, relative to one another. More specifically, the control circuit 51 (more specifically, the control unit 53) controls the generator 54 of the feedback circuit 52 such that the voltage level of the reference voltage Vr gradually increases when the intermittent operation of the two switching elements Q1, Q2 is started.

The control unit 53 outputs a second DC voltage to the resistor R2 and controls the switching element Q3 such that the switching element Q3 assumes the OFF state when the intermittent operation of the two switching elements Q1, Q2 is started. In the generator 54, the voltage level of the reference voltage Vr increases gradually according to a time constant determined by the resistors R2, R3 and the capacitor C3 in the time constant circuit. As a result, the control circuit 51 can change the switching frequencies of the two switching elements Q1, Q2 from high frequencies to low frequencies, relative to one another, when the intermittent operation of the two switching elements Q1, Q2 is started. Therefore, in the lighting device 10C, the occurrence of ringing in the drain-source voltage of the switching elements Q1, Q2 when the operation of the two switching elements Q1, Q2 is started can be suppressed. As a result, in the lighting device 10C, the application of excess stresses to the two switching elements Q1, Q2 can be suppressed even when deep dimming control is performed in the light source unit 20.

The control circuit 51 controls the feedback circuit 52 such that the difference output from the error amplifier 13 approaches zero within a period of time from the point of time at which the intermittent operation of the switching elements Q1, Q2 has been stopped to the point of time at which the intermittent operation of the switching elements Q1, Q2 is started. For the sake of convenience of explanation, the period from the point of time at which the intermittent operation of the switching elements Q1, Q2 has been stopped to the point of time at which the intermittent operation of the switching elements Q1, Q2 is started will be referred to as "second stop period of time".

More specifically, a ninth terminal P9 of the control unit 53 is electrically connected, for example, to an inverting input terminal of the error amplifier 13. The control unit 53 controls the feedback circuit 52 such that the voltage level of the detected voltage Vd input to the error amplifier 13 becomes equal to or higher than the voltage level of the reference voltage Vr within the second stop period of time. More specifically, the control unit 53 controls the error amplifier 13 such that the voltage level of the detected voltage Vd becomes equal to or higher than the voltage level of the reference voltage Vr by applying a voltage to the inverting input terminal of the error amplifier 13 through the ninth terminal P9. As a result, in the lighting device 10C, the difference output from the error amplifier 13 can be brought close to zero within the second stop period of time. Therefore, in the lighting device 10C, the occurrence of an overshoot in the output current Io when the intermittent operation of the two switching elements Q1, Q2 is started again can be suppressed even better. As a result, in the lighting device 10C, for example, a surge current can be better suppressed in the light source unit 20 even when the deep dimming control is performed in the light source unit 20. In other words, in the lighting device 10C, for example, the occurrence of flashing from the light source unit 20 can be better suppressed even when the deep dimming control is performed in the light source unit 20.

The control unit 53 is configured to control the feedback circuit 52 such that the voltage level of the detected voltage Vd becomes equal to or higher than the voltage level of the reference voltage Vr within the second stop period of time, but such a configuration is not limiting. The control unit 53, for example, may be configured (for example, the output terminal of the error amplifier 13 may be connected to a circuit ground within the second stop period of time) to control the feedback circuit 52 such that the difference output from the error amplifier 13 becomes zero within the second stop period of time. Further, the control unit 53 may be configured to cut off the supply of power to the error amplifier 13 within the second stop period of time.

Figure 8:
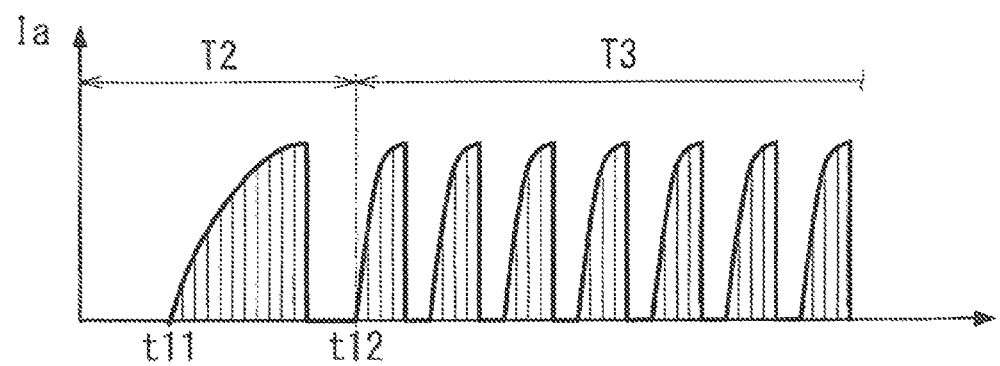
FIG. 8 is a waveform diagram that relates to the operation of the lighting device of Embodiment 4 and illustrates the waveform of electric current which is proportional to the voltage rectified by the rectification circuit.

The control circuit 51 controls the two switching elements Q1, Q2 such that there are a preparatory period of time T2 and an intermittent operation period of time T3, as depicted in FIG. 8. The preparatory period of time T2 is a period of time before the intermittent operation of the two switching elements Q1, Q2. The intermittent operation period of time T3 is a period of time in which the two switching elements Q1, Q2 operate intermittently. FIG. 8 schematically illustrates changes in the current Ia (see FIG. 7) proportional to the voltage that has been full-wave rectified by a rectification circuit 5. In FIG. 8, t11 represents a point of time at which the operation of the two switching elements Q1, Q2 has started. In FIG. 8, t12 represents a point of time at which the intermittent operation of the two switching elements Q1, Q2 has started.

The control circuit 51 controls the two switching elements Q1, Q2 (and the feedback circuit 52) such that the period of time in which the switching frequencies of the switching elements Q1, Q2 are changed from high frequencies to low frequencies, relative to one another, becomes relatively long within the preparatory period of time T2. Further, the control circuit 51 controls the two switching elements Q1, Q2 (and the feedback circuit 52) such that the period of time in which the switching frequencies of the switching elements Q1, Q2 are changed from high frequencies to low frequencies, relative to one another, becomes relatively short within the intermittent operation period of time T3. In other words, the control circuit 51 controls the two switching elements Q1, Q2 (and the feedback circuit 52) such that "the period of time in which the switching frequencies of the switching elements Q1, Q2 are changed from high frequencies to low frequencies, relative to one another" in the preparatory period of time T2 becomes longer than "the period of time in which the switching frequencies of the switching elements Q1, Q2 are changed from high frequencies to low frequencies, relative to one another" in the intermittent operation period of time T3. For the sake of convenience of explanation, the period of time in which the switching frequencies of the switching elements Q1, Q2 are changed from high frequencies to low frequencies, relative to one another, is referred to hereinbelow as "change period of time".

The tenth terminal P10 of the control unit 53 is electrically connected to a first terminal of the resistor R10 in the generator 54. In the lighting device 10C, a series circuit of the resistor R10 and the resistor R3 constitutes a resistance voltage-dividing circuit (referred to hereinbelow as "second resistive voltage-dividing circuit"), and the terminal voltage of the capacitor C3 is input as the reference voltage Vr to the non-inverting input terminal of the error amplifier 13. The resistance value of the resistor R10 is set, for example, lower than the resistant value of the resistor R2.

The control unit 53 outputs the second DC voltage to the resistor R2 of a first resistive voltage-dividing circuit and controls the switching element Q3 such that the switching element Q3 assumes the OFF state within the preparatory period of time T2. Meanwhile, the control unit 53 outputs the second DC voltage to the resistor R10 of the second resistive voltage-dividing circuit and controls the switching element Q3 such that the switching element Q3 assumes the OFF state within the intermittent operation period of time T3.

As described hereinabove, the resistance value of the resistor R2 is larger than the resistance value of the resistor R10. Therefore, the charging time of the capacitor C3 realized when the second DC voltage is output to the first terminal of the resistor R2 is longer than the charging time of the capacitor C3 realized when the second DC voltage is output to the first terminal of the resistor R10. As a result, the control circuit 51 can make the change period of time within the preparatory period of time T2 longer than that within the intermittent operation period of time T3. In other words, the control circuit 51 can make the change period of time within the intermittent operation period of time T3 shorter than that within the preparatory period of time T2. Therefore, in the lighting device 10C, the occurrence of flashing from the light source unit 20 within the preparatory period of time T2 can be suppressed. Further, in the lighting device 10C, the superposition of a ripple component on the output current Io within the intermittent operation period of time T3 can be suppressed.

The control circuit 51 is configured to control the two switching elements Q1, Q2 such as to provide the preparatory period of time T2 and the intermittent operation period of time T3, but such a configuration is not limiting. The control circuit 51 may control the two switching elements Q1, Q2 such that, for example, only the intermittent operation period of time T3 is provided.

Figure 9:
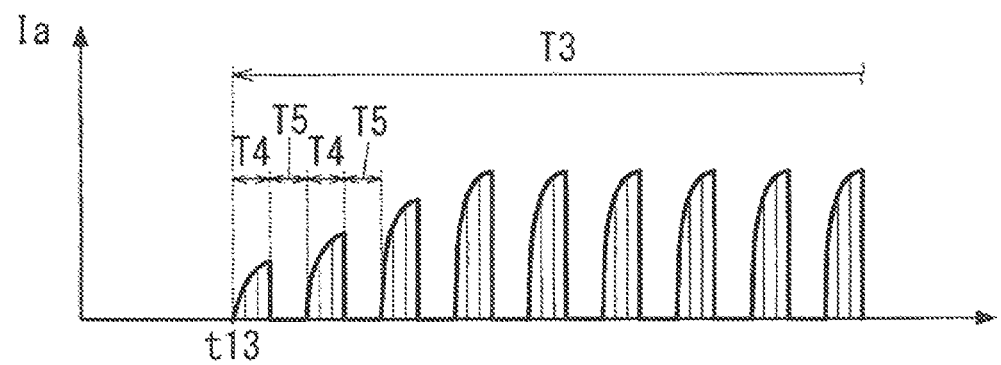
FIG. 9 is a waveform diagram that relates to another operation of the lighting device of Embodiment 4 and illustrates the waveform of electric current which is proportional to the voltage rectified by the rectification circuit.

More specifically, the control circuit 51 controls the two switching elements Q1, Q2 such that an operation period of time T4 and a pause period of time T5 are alternately repeated as the intermittent operation of the two switching elements Q1, Q2, as depicted in FIG. 9. The operation period of time T4 is a period of time in which the switching operation of the two switching elements Q1, Q2 is performed. The pause period of time T5 is a period of time in which the switching operation of the two switching elements Q1, Q2 is not performed. FIG. 9 schematically illustrates changes in the current Ia (see FIG. 7) proportional to the voltage that has been full-wave rectified by the rectification circuit 5. In FIG. 9, t13 represents a point of time at which the intermittent operation of the two switching elements Q1, Q2 has started.

The control circuit 51 controls the two switching elements Q1, Q2 such that the ratio of operation period of time T4 and the pause period of time T5 is constant. Further, the control circuit 51 controls the two switching elements Q1, Q2 such that the current Ia gradually increases when the intermittent operation of the two switching elements Q1, Q2 is started (point of time t13 in FIG. 9). As a result, in the lighting device 10C, the occurrence of flashing from the light source unit 20 when the intermittent operation of the two switching elements Q1, Q2 is started can be suppressed. Further, in the lighting device 10C, the superposition of a ripple component on the output current Io when the two switching elements Q1, Q2 operate intermittently can be suppressed.

In addition to the above-described functions, the control circuit 51 of the present embodiment has the functions same as those of the control circuit 3 of Embodiment 1. Further, the control circuit 51 (more specifically, the control unit 53) may include the timer 50 or may not include the timer 50.

The lighting device 10C of the present embodiment may be used instead of the lighting device 10 of Embodiment 1 in the lighting fixture 30.

In the lighting device 10C described hereinabove, the control circuit 51 is configured to control the two switching elements Q1, Q2 such that the two switching elements Q1, Q2 operate intermittently. The control circuit 51 is configured to change the switching frequencies of the two switching elements Q1, Q2 from high frequencies to low frequencies, relative to one another, when the intermittent operation of the two switching elements Q1, Q2 is started. The control circuit 51 is configured to control the feedback circuit 52 such that the difference output from the error amplifier 13 approaches zero within a period from a point of time at which the intermittent operation of the two switching elements Q1, Q2 is stopped to a point of time at which the intermittent operation of the two switching elements Q1, Q2 is started.

As a result, in the lighting device 10C, deep dimming control can be performed in the light source unit 20. Further, in the lighting device 10C, the occurrence of ringing in the drain-source voltage of the switching elements Q1, Q2 when the intermittent operation of the two switching elements Q1, Q2 is started can be suppressed. As a result, in the lighting device 10C, the application of excess stresses to the two switching elements Q1, Q2 can be suppressed even when deep dimming control is performed in the light source unit 20. Further, in the lighting device 10C, the difference output from the error amplifier 13 can be brought close to zero within the second stop period of time. Therefore, in the lighting device 10C, the occurrence of an overshoot in the output current Io when the intermittent operation of the two switching elements Q1, Q2 is restarted can be suppressed. As a result, in the lighting device 10C, the surge current can be suppressed, for example, even when deep dimming control is performed in the light source unit 20.

As indicated hereinabove, the control circuit 51 is preferably configured to control the feedback circuit 52 such that the voltage level of the reference voltage Vr input to the error amplifier 13 gradually increases when the intermittent operation of the two switching elements Q1, Q2 is started.

As a result, in the lighting device 10C, the switching frequencies of the two switching elements Q1, Q2 can be changed from high frequencies to low frequencies, relative to one another, when the intermittent operation of the two switching elements Q1, Q2 is started. Therefore, in the lighting device 10C, the occurrence of ringing in the drain-source voltage of the switching elements Q1, Q2 when the intermittent operation of the two switching elements Q1, Q2 is started can be suppressed. As a result, in the lighting device 10C, the application of excess stresses to the two switching elements Q1, Q2 can be suppressed even when deep dimming control is performed in the light source unit 20.

As described hereinabove, the control circuit 51 is preferably configured to control the two switching elements Q1, Q2 such as to provide the preparatory period of time T2 and the intermittent operation period of time T3. The preparatory period of time T2 is a period of time before the two switching elements Q1, Q2 operate intermittently. The intermittent operation period of time T3 is a period of time in which the two switching elements Q1, Q2 operate intermittently. The control circuit 51 is preferably configured to control the two switching elements Q1, Q2 such that the change period of time becomes relatively long within the preparatory period of time T2. Further, the control circuit 51 is preferably configured to control the two switching elements Q1, Q2 such that the change period of time becomes relatively short within the intermittent operation period of time T3. The change period of time is a period of time in which the switching frequencies of the two switching elements Q1, Q2 are changed from high frequencies to low frequencies, relative to one another.

As a result, in the lighting device 10C, the occurrence of flashing from the light source unit 20 within the preparatory period of time T2 can be suppressed. Further, in the lighting device 10C, the superposition of a ripple component on the output current Io within the intermittent operation period of time T3 can be suppressed.

The control circuit 51 is preferably configured to control the two switching elements Q1, Q2 such that the operation period of time T4 and the pause period of time T5 are repeated alternately as the intermittent operation of the two switching elements Q1, Q2. The operation period of time T4 is a period of time in which the two switching elements Q1, Q2 are caused to perform a switching operation. The pause period of time T5 is a period of time in which the two switching elements Q1, Q2 are not caused to perform the switching operation. The control circuit 51 is preferably configured to control the two switching elements Q1, Q2 such that a ratio of the operation period of time T4 and the pause period of time T5 becomes constant. The control circuit 51 is preferably configured to control the two switching elements Q1, Q2 such that an electric current Ia proportional to the voltage rectified by the rectification circuit 5 increases gradually (as an elapse of time) when the intermittent operation of the two switching elements Q1, Q2 is started.

As a result, in the lighting device 10C, the occurrence of flashing from the light source unit 20 when the intermittent operation of the two switching elements Q1, Q2 is started can be suppressed. Further, in the lighting device 10C, the superposition of a ripple component on the output current Io when the intermittent operation of the two switching elements Q1, Q2 is started can be suppressed.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device comprising:
a pair of input terminals;
a pair of output terminals;
at least two switching elements;
a control circuit that controls the at least two switching elements;
a resonance circuit including a coupling unit having a first inductor and a second inductor, a third inductor, and a first capacitor;
a rectification circuit configured to rectify a terminal voltage of the second inductor;
a second capacitor configured to smooth a voltage rectified by the rectification circuit; and
a feedback circuit configured to detect an output current which is a current flowing between the pair of output terminals or an output voltage which is a voltage applied between the pair of output terminals, and to feedback a difference between a reference voltage and a detected voltage which is a voltage proportional to the output current or the output voltage to the control circuit, wherein
the first inductor and the second inductor are magnetically coupled,
the at least two switching elements are connected in series,
the at least two switching elements connected in series are electrically connected between the pair of input terminals,
the third inductor is connected to a first terminal of the first inductor, and the first capacitor is connected to a second terminal of the first inductor,
a series circuit of the third inductor, the first inductor, and the first capacitor is connected in parallel to one of the at least two switching elements,
the second capacitor is electrically connected between the pair of output terminals,
the feedback circuit includes
a detector configured to detect the output current or the output voltage, and
an error amplifier configured to receive the detected voltage and the reference voltage and output the difference,
the control circuit is configured to control the at least two switching elements to perform a switching operation of repeatedly turning on and off the at least two switching elements such that the at least two switching elements operate separately from each other and the difference output from the error amplifier becomes zero,
the control circuit is configured to change switching frequencies of the at least two switching elements from high frequencies to low frequencies, relative to one another, when the switching operation of the at least two switching elements is started, and
the control circuit is configured to control the feedback circuit such that the difference output from the error amplifier approaches zero within a period of time from a point of time at which the switching operation of the at least two switching elements is stopped to a point of time at which the switching operation of the at least two switching elements is next started.

2. The lighting device according to claim 1, wherein
the control circuit is configured to control the at least two switching elements with a same switching frequency,
the control circuit is configured to control the at least two switching elements such that, when the change in the switching frequencies of the at least two switching elements from high frequencies to low frequencies, relative to one another, is started, the switching frequencies of the at least two switching elements become equal to or higher than a first resonance frequency which is a resonance frequency determined by an inductance of the first inductor and a capacitance of the first capacitor, and
the control circuit is configured to control the at least two switching elements such that, when the change in the switching frequencies of the at least two switching elements from high frequencies to low frequencies, relative to one another, is ended, the switching frequencies of the at least two switching elements become lower than the first resonance frequency and also equal to or higher than a second resonance frequency which is a resonance frequency determined by the inductance of the first inductor, an inductance of the third inductor, and the capacitance of the first capacitor.

3. The lighting device according to claim 1, wherein the control circuit is configured to control the feedback circuit such that, when the switching operation of the at least two switching elements is started, a voltage level of the reference voltage input to the error amplifier increases as an elapse of time.

4. The lighting device according to claim 3, wherein the feedback circuit further includes a generator configured to generate the reference voltage,
the generator includes a third capacitor,
the error amplifier is configured to receive a terminal voltage of the third capacitor as the reference voltage, and
the control circuit is configured to discharge electric charges, which have accumulated in the third capacitor, before the switching operation of the at least two switching elements is started, and charge the third capacitor when the switching operation of the at least two switching elements is started.

5. The lighting device according to claim 4, further comprising a series circuit of a resistor and a switch, the series circuit being connected between terminals of the third capacitor, wherein
the control circuit is configured to switch on the switch when the switching operation of the at least two switching elements is stopped and to switch off the switch before the switching operation of the at least two switching elements is started.

6. The lighting device according to claim 1, wherein the control circuit is configured to control the feedback circuit such that, when the switching operation of the at least two switching elements is stopped, a voltage level of the detected voltage input to the error amplifier becomes equal to or higher than a voltage level of the reference voltage.

7. The lighting device according to claim 6, wherein the error amplifier includes a first input terminal that receives the detected voltage and a second input terminal that receives the reference voltage, and
the control circuit is configured to apply a voltage to the first input terminal of the error amplifier when the switching operation of the at least two switching elements is stopped.

8. The lighting device according to claim 1, wherein the control circuit is configured to control the feedback circuit such that the difference output from the error amplifier becomes zero within a period of time from a point of time at which the switching operation of the at least two switching elements is stopped to a point of time at which the switching operation of the at least two switching elements is next started.

9. The lighting device according to claim 8, further comprising a switch connected between an output terminal of the error amplifier and a circuit ground, wherein
the control circuit is configured to switch on the switch when the switching operation of the at least two switching elements is stopped and to switch off the switch when the switching operation of the at least two switching elements is next started.

10. The lighting device according to claim 1, wherein the control circuit is configured to cut off power supply, which is supplied to the error amplifier, when the switching operation of the at least two switching elements is stopped.

11. The lighting device according to claim 1, wherein the control circuit includes a timer configured to time a predetermined period of time,
the predetermined period of time is a period of time from a point of time at which the switching operation of the at least two switching elements is stopped to a point of time at which the difference output from the error amplifier becomes less than a specific value, and
the control circuit is configured to next start the switching operation of the at least two switching elements after the timer has timed the predetermined period of time when the switching operation of the at least two switching elements has stopped.

12. The lighting device according to claim 1, wherein the control circuit is configured to next start the switching operation of the at least two switching elements after the difference output from the error amplifier becomes equal to or less than a specific value, when the switching operation of the at least two switching elements has stopped.

13. The lighting device according to claim 1, wherein the control circuit is configured to control the at least two switching elements to perform an intermittent operation in which the at least two switching elements performs the switching operation intermittently,
the control circuit is configured to change the switching frequencies of the at least two switching elements from high frequencies to low frequencies, relative to one another, when the intermittent operation of the at least two switching elements is started, and
the control circuit is configured to control the feedback circuit such that the difference output from the error amplifier approaches zero within a period of time from a point of time at which the intermittent operation of the at least two switching elements is stopped to a point of time at which the intermittent operation of the at least two switching elements is next started.

14. The lighting device according to claim 13, wherein the control circuit is configured to control the feedback circuit such that, when the intermittent operation of the at least two switching elements is started, a voltage level of the reference voltage input to the error amplifier gradually increases.

15. The lighting device according to claim 13, wherein the control circuit is configured to control the at least two switching elements such as to provide a preparatory period of time, which is a period of time before the at least two switching elements operating according to the intermittent operation, and an intermittent operation period of time, which is a period of time in which the at least two switching elements operating according to the intermittent operation,
the control circuit is configured to control the at least two switching elements such that a change period of time, which is a period of time in which the switching frequencies of the at least two switching elements are changed from high frequencies to low frequencies relative to one another, becomes relatively long within the preparatory period of time, and
the control circuit is configured to control the at least two switching elements such that the change period of time becomes relatively short within the intermittent operation period of time.

16. The lighting device according to claim 13, wherein
the control circuit is configured to control the at least two switching elements such that an operation period of time, which is a period of time in which the at least two switching elements are caused to perform the switching operation, and a pause period of time, which is a period of time in which the at least two switching elements are not caused to perform the switching operation, are repeated alternately as the intermittent operation of the at least two switching elements,
the control circuit is configured to control the at least two switching elements such that a ratio of the operation period of time and the pause period of time becomes constant, and
the control circuit is configured to control the at least two switching elements such that an electric current proportional to the voltage rectified by the rectification circuit increases as an elapse of time, when the intermittent operation of the at least two switching elements is started.

17. The lighting device according to claim 1, further comprising a filter circuit, a second rectification circuit different from a first rectification circuit which is the rectification circuit, a power factor improvement circuit, and a fourth capacitor, wherein
the filter circuit is configured to remove noise,
the second rectification circuit is configured to rectify an AC voltage input to the pair of input terminals,
the power factor improvement circuit is configured to improve a power factor of a voltage rectified by the second rectification circuit,
the fourth capacitor is configured to smooth the voltage, the power factor of which has been improved by the power factor improvement circuit,
the filter circuit is electrically connected to the pair of input terminals, and the filter circuit is electrically connected to the second rectification circuit, and
the at least two switching elements connected in series are electrically connected between terminals of the fourth capacitor.

18. The lighting device according to claim 1, wherein
the feedback circuit further includes a generator configured to generate the reference voltage,
the generator includes a parallel circuit of a third capacitor and a resistor,
the error amplifier includes a first input terminal that receives the detected voltage and a second input terminal connected to a first terminal of the parallel circuit,
a second terminal of the parallel circuit is connected to a circuit ground, and
a time constant of a discharge time of electric charges of the second capacitor by a light source unit is less than a time constant of a discharge time of electric charges of the third capacitor by the resistor.

19. A lighting fixture comprising:
a light source unit including a solid-state light-emitting element; and
the lighting device according to claim 1, wherein
the lighting device is configured to turn on the light source unit.

* * * * *